US012601364B1

(12) United States Patent
Inácio et al.

(10) Patent No.: US 12,601,364 B1
(45) Date of Patent: Apr. 14, 2026

(54) EXPANDABLE INSERT BASED MOUNTING ASSEMBLY

(71) Applicant: Tractian Technologies Inc, Atlanta, GA (US)

(72) Inventors: Lucas Inácio, São Paulo (BR); Flávio Roberto Bizerra Junior, São Paulo (BR); João Cadorin Falleiros, São Paulo (BR); Vinicius Martim, São Paulo (BR)

(73) Assignee: Tractian Technologies Inc, Atlanta, GA (US)

( * ) Notice: Subject to any disclaimer, the term of this patent is extended or adjusted under 35 U.S.C. 154(b) by 0 days.

(21) Appl. No.: 19/324,315

(22) Filed: Sep. 10, 2025

(51) Int. Cl.
*F16B 7/18* (2006.01)
*G01H 1/00* (2006.01)

(52) U.S. Cl.
CPC ................. *F16B 7/18* (2013.01); *G01H 1/00* (2013.01)

(58) Field of Classification Search
CPC .................................... G01H 1/00; F16B 7/18
See application file for complete search history.

(56) References Cited

U.S. PATENT DOCUMENTS

| | | | | |
|---|---|---|---|---|
| 4,518,293 | A | * | 5/1985 | Pleickhardt ............. F16B 37/02 16/42 T |
| 4,519,368 | A | * | 5/1985 | Hudson, Jr. .......... F02M 69/465 123/468 |
| 4,603,996 | A | * | 8/1986 | Chen ...................... F16B 7/025 403/237 |
| 5,310,298 | A | * | 5/1994 | Hwang ..................... F16B 7/18 403/252 |

(Continued)

FOREIGN PATENT DOCUMENTS

| | | | | |
|---|---|---|---|---|
| EP | 0564889 | A1 | * 10/1993 | ............ E04F 11/181 |
| GB | 2279717 | B | * 10/1996 | ................ F16B 7/18 |
| WO | WO-2022111947 | A1 | * 6/2022 | .......... F16B 13/0858 |

OTHER PUBLICATIONS

Dziuk et al.; EP0564889A1 Connecting device, in particular for a tubular member (EPO English Machine Translation); Oct. 19, 1993; pp. 1-19 (Year: 1993).*

*Primary Examiner* — Bayan Salone

(74) *Attorney, Agent, or Firm* — Cognition IP, P.C.; Edward Steakley; Justin White

(57) ABSTRACT

A mounting assembly couples a separate mechanical component to a separate mechanical asset and includes an expansion subassembly and a locking subassembly. The expansion subassembly includes an expandable insert having expansion features, an expander that actuates the expansion features, and an anchoring feature. The expansion subassembly is placed within a threadless opening of the mechanical asset with the anchoring feature outside. The expander actuates the expansion features into sidewall(s) of the threadless opening to fasten the expansion subassembly to the mechanical asset. The locking subassembly includes an outer base, a locking component, and a threaded inner opening that accepts rotational insertion of a threaded portion of the mechanical component. The locking component couples to the anchoring feature to lock the locking subassembly in place against the expansion subassembly and mechanical asset. Inserting the mechanical component threaded portion into the threaded inner opening mounts the mechanical component to the mechanical asset.

13 Claims, 26 Drawing Sheets

(56)  References Cited

U.S. PATENT DOCUMENTS

| | | | | |
|---|---|---|---|---|
| 5,458,448 | A * | 10/1995 | Cheng | F16B 13/0866 |
| | | | | 411/33 |
| 5,810,502 | A * | 9/1998 | Reitz | E05B 3/02 |
| | | | | 403/230 |
| 6,270,303 | B1 * | 8/2001 | Gauthier | F16B 13/065 |
| | | | | 411/60.3 |
| 11,111,941 | B2 * | 9/2021 | Pregartner | F16B 13/0858 |
| 2024/0003369 | A1 * | 1/2024 | Knapp | F16B 12/2063 |

* cited by examiner

101

120

110

130

120

122

121

120

123

122

130

130

160

162

168

164

166

160

162     168

164

166

160

162

168

166

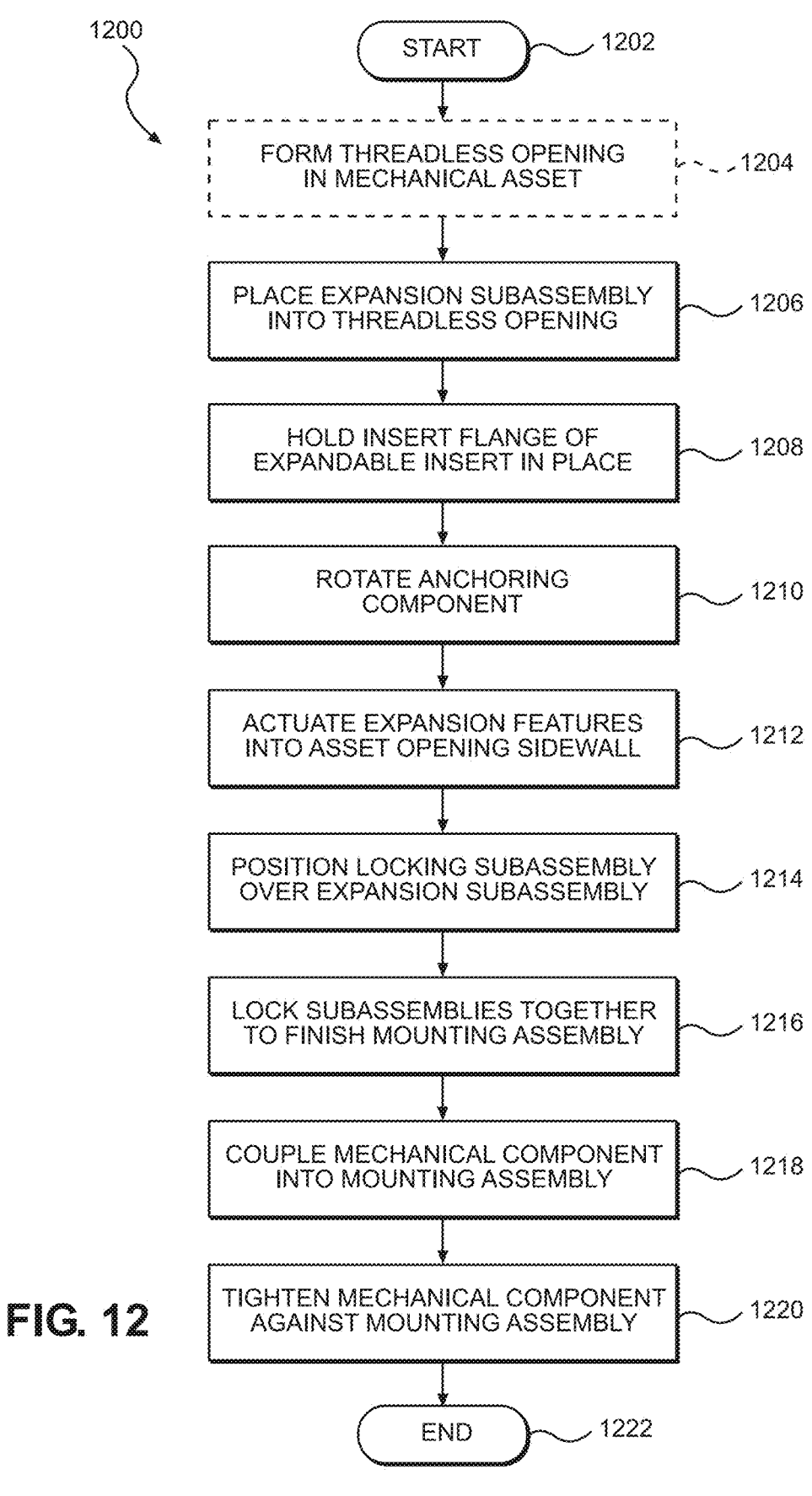

1200

START — 1202

FORM THREADLESS OPENING
IN MECHANICAL ASSET — 1204

PLACE EXPANSION SUBASSEMBLY
INTO THREADLESS OPENING — 1206

HOLD INSERT FLANGE OF
EXPANDABLE INSERT IN PLACE — 1208

ROTATE ANCHORING
COMPONENT — 1210

ACTUATE EXPANSION FEATURES
INTO ASSET OPENING SIDEWALL — 1212

POSITION LOCKING SUBASSEMBLY
OVER EXPANSION SUBASSEMBLY — 1214

LOCK SUBASSEMBLIES TOGETHER
TO FINISH MOUNTING ASSEMBLY — 1216

COUPLE MECHANICAL COMPONENT
INTO MOUNTING ASSEMBLY — 1218

TIGHTEN MECHANICAL COMPONENT
AGAINST MOUNTING ASSEMBLY — 1220

END — 1222

FIG. 12

EXPANDABLE INSERT BASED MOUNTING ASSEMBLY

CROSS-REFERENCE TO RELATED APPLICATION

This application is related to commonly owned U.S. patent application Ser. No. 19/297,904 filed on Aug. 12, 2025, titled "SELF-ALIGNING THREADED MOUNTING ASSEMBLY," which application is hereby incorporated by reference in its entirety herein.

TECHNICAL FIELD

The present disclosure relates generally to mechanical coupling arrangements, and more particularly to improved mounting assemblies for coupling mechanical components.

BACKGROUND

Industrial machinery typically involves the implementation of sensors to monitor aspects and performance of machine operations. These can include, for example, vibration, temperature, current, pressure, moisture, and other types of industrial sensors. Many industrial sensors require installation at specific locations and/or orientations relative to machinery to be effective. For example, some vibration sensors must be field installed at a specific rotational orientation relative to any industrial equipment to which it is coupled and intended to monitor. In such situations, mounting assemblies are typically used to couple sensors or other mechanical components to industrial engines or other mechanical assets. While mounting assemblies based on magnetic, glue, or other adhesive based arrangements are sometimes used, many popular mounting assemblies involve those with threaded attachment features, which can require the existence or creation of threaded openings in the relevant industrial equipment.

Unfortunately, many conventional processes of forming threaded openings can be time-consuming and impractical for rapid, repeatable deployments, especially in industrial environments where speed, reliability, and mechanical integrity are essential. Cutting threads into openings can be prone to error, which can then result in improper fastening and unreliable couplings of mounting assemblies or other mechanical components. Furthermore, the use of threaded openings can require a relatively deep minimum depth in the hole or opening to be able to properly cut an accurate thread. Such minimum depths can be inconvenient or even prohibitive for some industrial equipment or other mechanical assets.

Although traditional ways of coupling mechanical components to mechanical assets using mounting assemblies have worked well in the past, improvements are always helpful. In particular, what is desired are improved mounting assemblies that facilitate coupling mechanical components to mechanical assets without the need for magnetic items, adhesives, or threaded openings in the mechanical assets.

SUMMARY

It is an advantage of the present disclosure to provide improved mounting assemblies that facilitate coupling mechanical components to mechanical assets without the need for magnetic items, adhesives, or threaded openings in the mechanical assets. The disclosed features, apparatuses, systems, and methods relate to expandable insert based mounting assemblies having mechanical arrangements that can involve adhesive-free interference fits that rely on radial and normal force generation, which in turn enables high retention mounting into threadless openings, among other advantageous features. In particular, the disclosed embodiments can involve the use of mounting assemblies having mechanically interlocking subassemblies that include expandable inserts with expansion features that can be pushed into threadless opening sidewalls in mechanical assets to fasten the mounting assemblies to the mechanical assets, as well as threaded inner openings that facilitate the ready coupling of mechanical components to mechanical assets at specific rotational alignments.

In various embodiments of the present disclosure, a mounting assembly can include an expansion subassembly and a locking subassembly. The expansion subassembly can include an expandable insert having one or more expansion features, an expander configured to actuate the one or more expansion features, and an anchoring component having an anchoring feature coupled to the expandable insert and expander. The expansion subassembly can be configured to be placed within a threadless opening in a separate mechanical asset such that the anchoring feature remains outside the threadless opening while the expander actuates the one or more expansion features into one or more sidewalls in the threadless opening to fasten the expansion subassembly to the separate mechanical asset. The locking subassembly can include an outer base, a locking component, and a threaded inner opening at a fixed location relative to the outer base and configured to accept a rotational insertion therein of a threaded portion of a separate mechanical component. The locking component can be configured to couple to the anchoring feature and to lock the locking subassembly in place relative to the anchoring feature and separate mechanical asset such that insertion of the separate mechanical component threaded portion into the threaded inner opening mounts the separate mechanical component to the separate mechanical asset.

In various detailed embodiments, the separate mechanical asset can be an industrial engine, and the separate mechanical component can be a vibration sensor. The expansion subassembly can be configured to be installed into the separate mechanical asset without the presence of the locking subassembly. The anchoring component can be configured to actuate the expander in some arrangements. The expandable insert can include an insert flange having a central opening and the expansion features can include one or more flexible tabs arranged around the central opening and extending downward from the insert flange. The expandable insert can be configured to be placed across the threadless opening such that the insert flange remains above the threadless opening and the flexible tabs extend into the threadless opening in position be pushed outward into one or more sidewalls of the threadless opening. The anchoring component can be a double threaded bolt including a threaded protrusion extending from a threaded flange, the threaded protrusion defining a first diameter and the threaded flange defining a second diameter that is greater than the first diameter. The threaded protrusion can be configured to extend into the threadless opening to actuate the expander and the threaded flange can be configured to form the anchoring feature outside the threadless opening. The expander can be a conical expander including a conical outer surface having a top outer diameter smaller than a bottom outer diameter and a threaded central opening extending therethrough, with the threaded central opening being coupled onto the threaded protrusion of the double threaded bolt. The conical expander can be configured such that rotating the double threaded bolt results in pulling the conical expander upward toward the insert flange such that the conical outer surface contacts and pushes the flexible tabs into the sidewall(s) of the threadless opening.

In further detailed embodiments, the outer base can include a sleeve including one or more walls coupled to an endcap at a bottom end thereof to define an inner volume having a sleeve opening at a top end. The endcap can include a bottom surface configured to contact an outer surface of the separate mechanical asset and an endcap opening configured to be placed over the anchoring feature such that the anchoring feature extends into the inner volume. The locking component can include a locking nut having an internal thread configured to be coupled onto a thread of the anchoring feature and an outer diameter that is greater than the endcap opening diameter but less than the inner volume diameter such that the locking nut is configured to be contained and rotatable within the inner volume of the sleeve. The locking nut can be configured to be rotatably tightened onto the anchoring feature to clamp the endcap against the separate mechanical asset and lock the sleeve in place. The locking subassembly can further include a locking insert fitted within the sleeve opening such that the locking insert is unable to move relative to the sleeve and the locking nut is fully constrained within the inner volume. The locking insert can include the threaded inner opening. In some arrangements, the sleeve can include an upper surface configured to contact and provide a physical stop against a bottom surface of the separate mechanical component when the threaded portion of the separate mechanical component is inserted into and sufficiently rotated within the threaded inner opening.

In further embodiments of the present disclosure, an expandable insert based mounting assembly configured to mount a separate mechanical component to a separate mechanical asset can include an expandable insert, an anchoring bolt, a conical expander, a sleeve, a locking nut, and a locking insert. The expandable insert can include an insert flange having a central opening and one or more flexible tabs arranged around the central opening and extending downward from the insert flange. The expandable insert can be configured to be placed across a threadless opening in a separate mechanical asset such that the insert flange remains above the threadless opening and the one or more flexible tabs extend into the threadless opening. The one or more flexible tabs can be configured to be pushed outward into one or more sidewalls of the threadless opening. The anchoring bolt can include a threaded protrusion extending from a threaded flange, the threaded protrusion defining a first diameter and the threaded flange defining a second diameter that is greater than the first diameter. The threaded protrusion can extends through the insert flange central opening of the expandable insert and between the one or more flexible tabs. The threaded flange can have a diameter greater than the diameter of the insert flange central opening and can rest above the insert flange. The conical expander can include a conical outer surface having a top outer diameter smaller than a bottom outer diameter and a threaded central opening extending therethrough. The threaded central opening can be coupled onto the threaded protrusion of the anchoring bolt. The conical expander can be configured such that rotating the anchoring bolt results in pulling the conical expander upward toward the insert flange such that the conical outer surface contacts and pushes the one or more flexible tabs into the one or more sidewalls of the threadless opening to fasten the expandable insert, anchoring bolt, and conical flange to the separate mechanical asset. The sleeve can include one or more walls coupled to an endcap at a bottom end thereof to define an inner volume having a sleeve opening at a top end. The endcap can include a bottom surface configured to contact an outer surface of the separate mechanical asset and an endcap opening configured to be placed over the insert flange and anchoring bolt threaded flange such that the threaded flange extends into the inner volume. The locking nut can include an internal thread configured to be coupled onto the threaded flange of the anchoring bolt and an outer diameter that is greater than the endcap opening diameter but less than the inner volume diameter such that the locking nut is configured to be contained and rotatable within the inner volume of the sleeve. The locking nut can be configured to be rotatably tightened onto the anchoring bolt to clamp the endcap against the separate mechanical asset and lock the sleeve in place. The locking insert can be fitted within the sleeve opening such that the locking insert is unable to move relative to the sleeve and the locking nut is fully constrained within the inner volume. The locking insert can include a threaded inner opening configured to accept a rotational insertion therein of a threaded portion of a separate mechanical component such that the separate mechanical component is mounted to the separate mechanical asset at a specific rotational orientation relative to the separate mechanical asset.

In various detailed embodiments, the separate mechanical asset can be an industrial engine and the separate mechanical component can be a vibration sensor. The expandable insert, the anchoring bolt, and the conical expander can combine to form an expansion subassembly, while the sleeve, the locking nut, and the locking insert can combine to form a locking subassembly. The expansion subassembly can be configured to be installed into the separate mechanical asset without the presence of the locking subassembly. In some arrangements, the anchoring bolt can include a bolt tightening feature at a top surface of the threaded flange, and this bolt tightening feature can be configured to facilitate rotation of the anchoring bolt to pull the conical expander upward. The locking nut can include a nut tightening feature at a top surface of the locking nut. The nut tightening feature can be configured to facilitate rotation of the locking nut to clamp the endcap against the separate mechanical asset and lock the sleeve in place. Both of the bolt tightening feature and the nut tightening feature can be configured to be accessed via the threaded inner opening of the locking insert while the locking nut is fully constrained within the inner volume of the sleeve.

In still further embodiments of the present disclosure, various methods of mounting a mechanical component to a mechanical asset using an expandable insert based mounting assembly are provided. Pertinent process steps can include placing an expansion subassembly into a mechanical asset opening, actuating expansion features, positioning a locking subassembly over the expansion subassembly, locking the locking subassembly onto the expansion subassembly, and coupling the mechanical component to the mounting assembly. The mechanical asset opening can be a threadless opening. The expansion subassembly can include an expandable insert having one or more expansion features, an expander, and an anchoring component having an anchoring feature that remains outside the threadless opening while the expansion features are within the threadless opening. The expansion features can be actuated into one or more sidewalls of the threadless opening to fasten the expansion subassembly to the mechanical asset. The locking subassembly can be positioned over the anchoring feature of the expansion subassembly. The locking subassembly can include an outer base, a locking component, and a threaded inner opening at a fixed location relative to the outer base. The locking component can be locked to the anchoring feature to finish forming an expandable insert based mounting assembly including the locking subassembly and the expansion subassembly. Coupling the mechanical component can involve rotatably inserting a threaded portion of the mechanical component into the threaded inner opening of the locking subassembly.

In various detailed embodiments, further process steps can include forming the threadless opening in the mechanical asset, holding an insert flange of the expandable insert in place outside the threadless opening, rotating the anchoring component while holding the insert flange in place, the anchoring component further including a threaded protrusion that extends into the expander within the threadless opening, wherein rotating the anchoring component actuates the expander which in turn actuates the one or more expansion features, and tightening the threaded portion of the mechanical component into the threaded inner opening of the locking subassembly until a bottom surface of the mechanical component contacts an upper surface of the outer base and a desired torque value is achieved.

Other apparatuses, methods, features, and advantages of the disclosure will be or will become apparent to one with skill in the art upon examination of the following figures and detailed description. It is intended that all such additional apparatuses, methods, features and advantages be included within this description, be within the scope of the disclosure, and be protected by the accompanying claims.

BRIEF DESCRIPTION OF THE DRAWINGS

The included drawings are for illustrative purposes and serve only to provide examples of possible structures, arrangements, and methods of use for expandable insert based mounting assemblies. These drawings in no way limit any changes in form and detail that may be made to the disclosure by one skilled in the art without departing from the spirit and scope of the disclosure.

FIG. 12 illustrates a flowchart of an example detailed method of mounting a mechanical component to a mechanical asset using an expandable insert based mounting assembly according to one embodiment of the present disclosure.

DETAILED DESCRIPTION

Figure 1A:
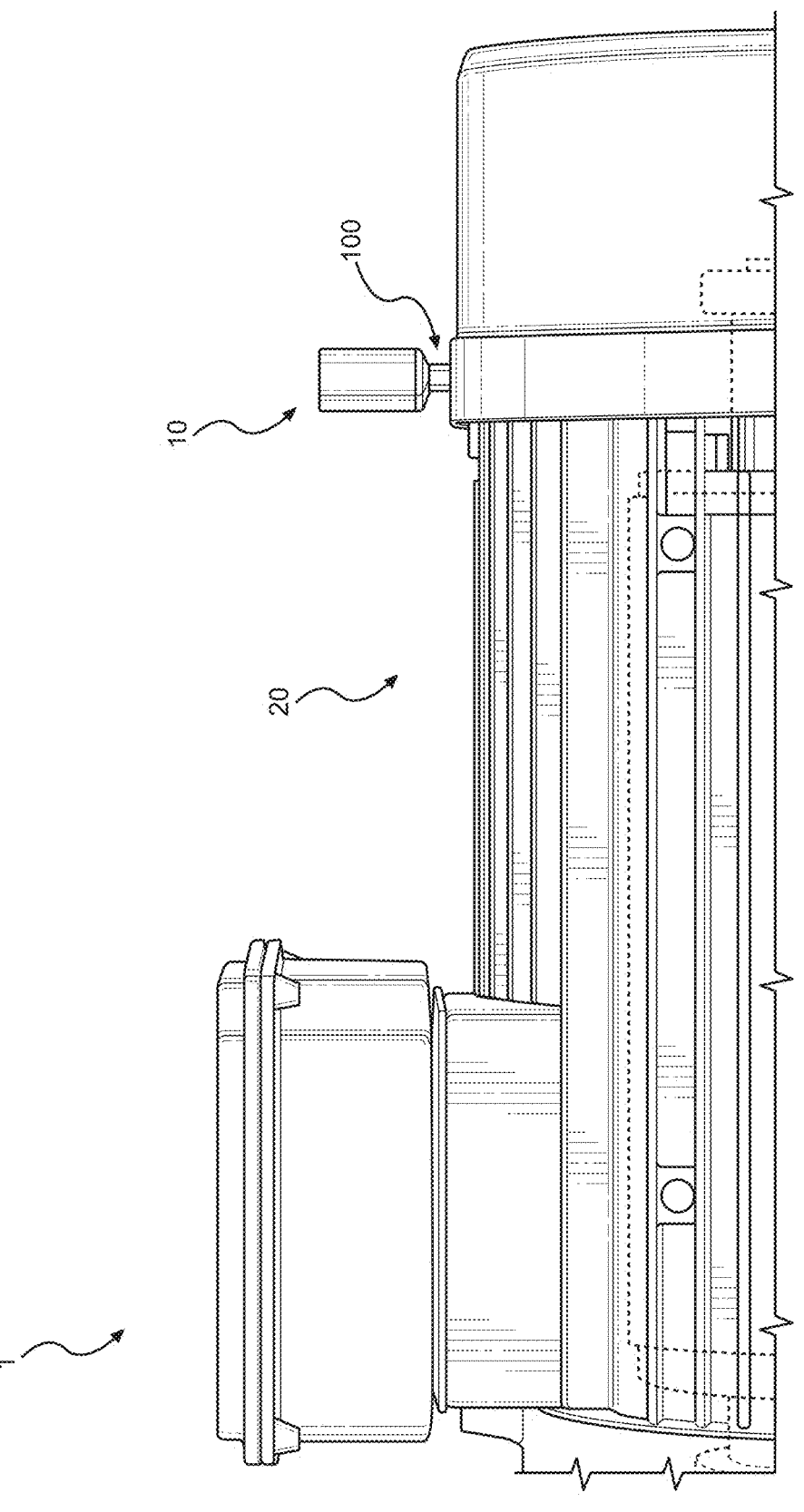
FIG. 1A illustrates in side elevation view an environment with a mechanical component coupled to a mechanical asset using an example expandable insert based mounting assembly according to one embodiment of the present disclosure.

Exemplary applications of apparatuses, systems, and methods according to the present disclosure are described in this section. These examples are being provided solely to add context and aid in the understanding of the disclosure. It will thus be apparent to one skilled in the art that the present disclosure may be practiced without some or all of these specific details provided herein. In some instances, well known process steps have not been described in detail in order to avoid unnecessarily obscuring the present disclosure. Other applications are possible, such that the following examples should not be taken as limiting. In the following detailed description, references are made to the accompanying drawings, which form a part of the description and in which are shown, by way of illustration, specific embodiments of the present disclosure. Although these embodiments are described in sufficient detail to enable one skilled in the art to practice the disclosure, it is understood that these examples are not limiting, such that other embodiments may be used, and changes may be made without departing from the spirit and scope of the disclosure.

The present disclosure relates in various embodiments to features, apparatuses, systems, and methods involving mounting assemblies. In particular, this can include mounting assemblies configured to mount a separate mechanical component to a separate mechanical asset using an unthreaded hole or opening in the mechanical asset rather than using a threaded opening or an adhesive based mounting. In specific arrangements, the mechanical component can be an industrial sensor, such as a vibration sensor, while the mechanical asset can be industrial mechanical equipment, such as an industrial motor.

As will be readily appreciated by those of skill in the art, the use of some industrial sensors can depend heavily on a sensor being installed properly with respect to its monitored or tracked industrial equipment item or other asset. Proper installation of a sensor can involve the correct placement, mounting, fixture stiffness, and rotational alignment with respect to its tracked item. As one example, many types of standard vibration sensors operate accurately when they are mounted directly to an industrial equipment item that they are monitoring, with such mounting being at an optimal location on the item as well as an optimal relative rotational orientation with respect to the item being monitored for vibration.

As is generally well known, there are many different ways to mount separate components within an industrial setting or environment, and some mounting techniques involve controlling for a specific or precise rotational orientation of mounted components. Such a specific rotational orientation can be desirable where a mechanical component is a vibration sensor that is mounted to a larger vibrating mechanical asset, such as an industrial motor, for example. One arrangement for mounting a mechanical component to a mechanical asset in a manner that controls for a specific rotational orientation of the mechanical component can be found in, for example, U.S. patent application Ser. No. 19/297,904 filed on Aug. 12, 2025, titled "SELF-ALIGNING THREADED MOUNTING ASSEMBLY," which application is again hereby incorporated by reference in its entirety herein. This involves a threaded arrangement where the mounting assembly includes a threaded protrusion that is inserted into a threaded opening formed in the mechanical asset.

Unfortunately, threaded openings in mechanical assets are not always available or desirable in some circumstances, as noted above. The present disclosure accounts for such arrangements where threaded openings are not available but threadless openings are possible. The disclosed embodiments provide expandable insert based mounting assemblies having mechanical arrangements that can involve adhesive-free interference fits that rely on radial and normal force generation, which in turn enables high retention mounting into threadless openings, among other advantageous features. In particular, the disclosed embodiments can involve the use of mounting assemblies that include expandable inserts with expansion features that can be pushed into threadless opening sidewalls in mechanical assets to fasten the mounting assemblies to the mechanical assets, among other components and features.

Although various embodiments disclosed herein discuss the specific application of mounting a vibration sensor to an industrial motor or engine, it will be readily appreciated that the disclosed features, apparatuses, systems, and methods of use for mounting assemblies can also be used in other applications and environments where mounting a separate mechanical component to a separate mechanical asset is desired. While the disclosed mounting assemblies specifically include expandable inserts and related components, it will be understood that other components and variations can alternatively be used to facilitate coupling a mounting assembly to a mechanical asset and also to a mechanical component in a reliable manner. Furthermore, while some examples are provided for specific tools, components, features, and materials, it will be understood that these can be replaced with any suitable substitute or alternative tools, components, features and/or materials that take advantage of the disclosed expandable insert based mounting assemblies and their various components. Other applications, arrangements, and extrapolations beyond the illustrated embodiments are also contemplated.

Referring first to FIG. 1A, an environment with a mechanical component coupled to a mechanical asset using an example expandable insert based mounting assembly is illustrated in side elevation view. Industrial environment 1 can include a relatively smaller mechanical component 10 that is mounted to a relatively larger mechanical asset 20 by way of a mounting assembly 100, which can be an expandable insert based mounting assembly. In various arrangements, mechanical component 10 can be a sensor, such as a vibration sensor, for example. Other types of sensors are also possible, such as, temperature, current, pressure, and moisture sensors, with other types of mechanical components suitable for mounting also being possible. In various arrangements, mechanical asset 20 can be a manufacturing or industrial item, such as an industrial motor, although other types of mechanical assets are also possible.

Similar to the foregoing example requiring a threaded opening in the mechanical asset, expandable insert based mounting assembly 100 can be configured to mount mechanical component 10 to mechanical asset 20 in a manner that results in a specific rotational orientation of mechanical component 10 with respect to mechanical asset 20. Unlike the foregoing example, however, expandable insert based mounting assembly 100 can be configured to function with a mechanical asset opening that is not threaded. This advantageous functionality can also result in the ability to utilize a shallower opening since there is no need to cut or form a thread therein.

Figure 1B:
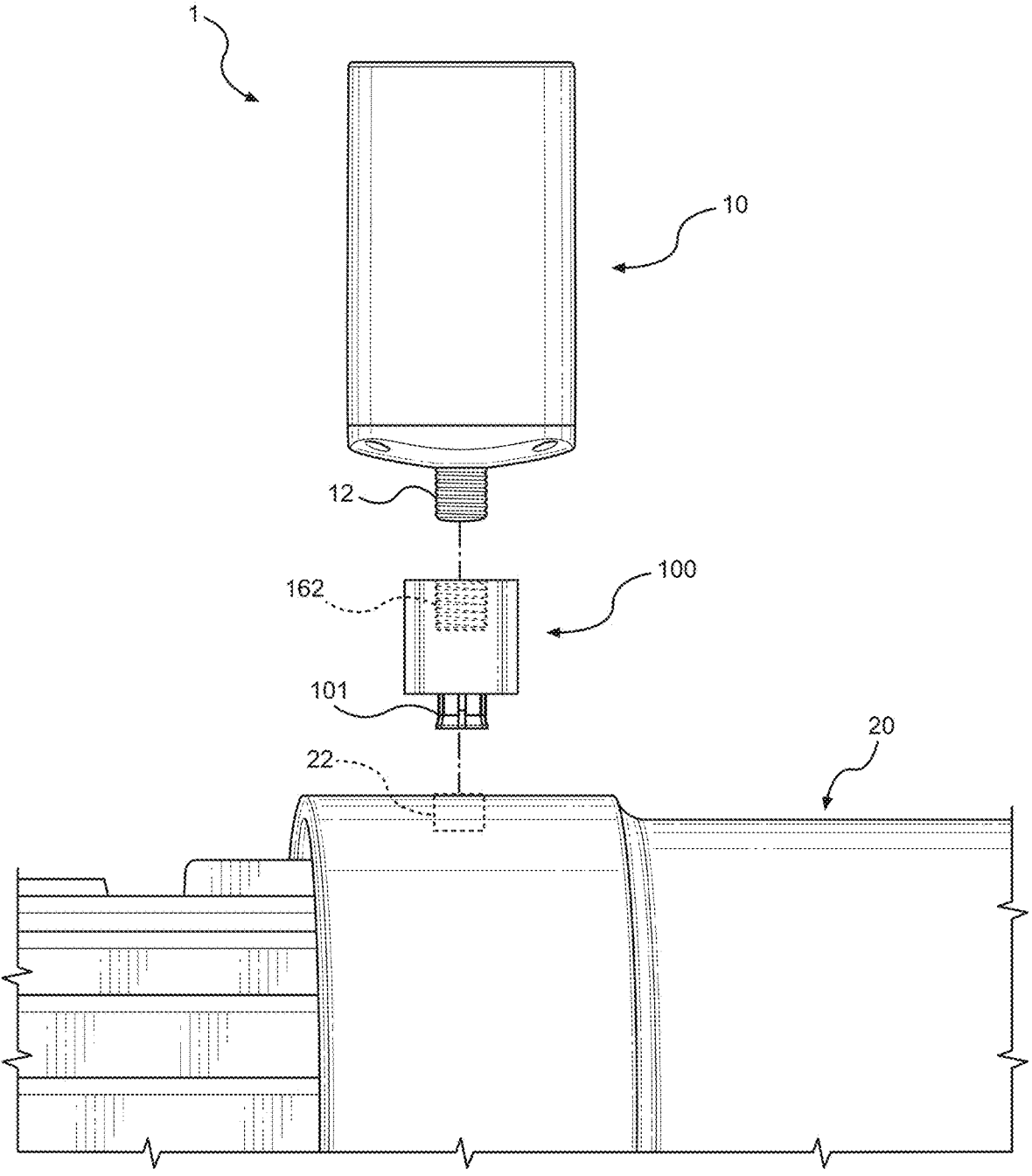
FIG. 1B illustrates in side exploded close-up view the environment of FIG. 1A with the mechanical component, mechanical asset, and example expandable insert based mounting assembly all uncoupled according to one embodiment of the present disclosure.

FIG. 1B illustrates in side exploded close-up view the environment of FIG. 1A with the mechanical component, mechanical asset, and example expandable insert based mounting assembly all uncoupled from each other. In some arrangements, mechanical component 10 and mechanical asset 20 can be separate items that are already available with a desire to mount, attach, or otherwise couple the mechanical component to the mechanical asset, such as by way of using expandable insert based mounting assembly 100. Mechanical component 10 can be relatively smaller compared with mechanical asset 20 such that coupling these items together can involve moving and mounting a vibration sensor or other smaller portable mechanical component along with expandable insert based mounting assembly 100 onto an industrial motor or other larger stationary mechanical asset.

In various embodiments, expandable insert based mounting assembly 100 can be attached or coupled to both mechanical component 10 and mechanical asset 20, and this can involve one or more features on all of these items. Mechanical component 10 can have a threaded post or portion 12 extending outward from a bottom region thereof, which can be standard or readily available features on the mechanical component. For example, many vibration sensors can have a built-in threaded post designed for mounting or coupling the sensor to another item. Mounting assembly 100 can have a threaded inner opening 162 configured to receive threaded portion 12 of mechanical component 10 to facilitate directly attaching or otherwise coupling, such as by rotational insertion of threaded portion 12 into threaded inner opening 162. Mounting assembly 100 can also include an expansion subassembly 101 extending therefrom, which can be configured to be inserted into a threadless opening 22 located along an outer surface of mechanical asset 20. Once inserted, one or more expansion features of expansion subassembly 101 can be forced to expand into one or more sidewalls of threadless opening 22 to fasten the expansion subassembly (and ultimately entire mounting assembly 100) to mechanical asset 20. Further descriptions for each of these items, subassemblies, components, and features are provided in greater detail below.

Figure 2:
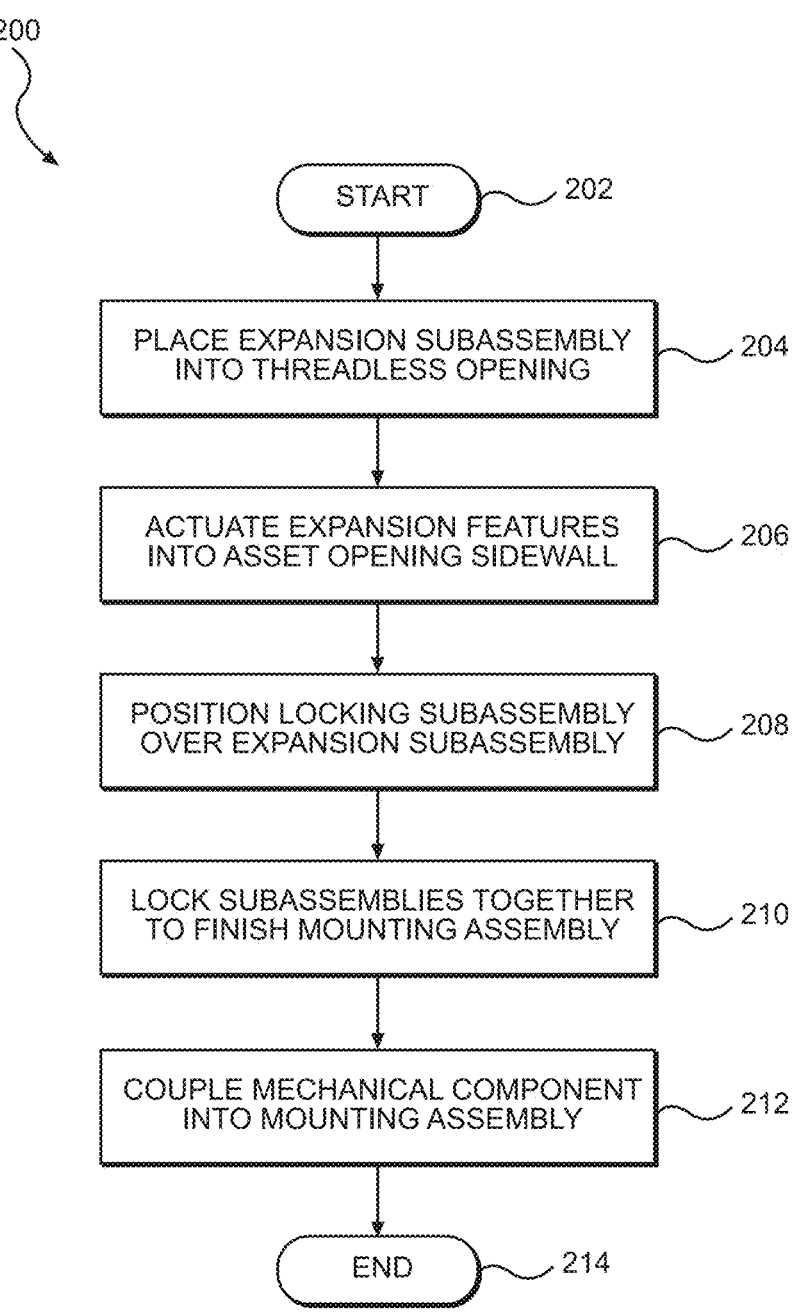
FIG. 2 illustrates a flowchart of an example summary method of mounting a mechanical component to a mechanical asset using an expandable insert based mounting assembly according to one embodiment of the present disclosure.

Moving next to FIG. 2, a flowchart is provided of an example summary method of mounting a mechanical component to a mechanical asset using an expandable insert based mounting assembly. Summary method 200 can represent one broad aspect of various overall methods of mounting a mechanical component to a mechanical asset, and it will be understood that various other steps and details of such a broad aspect and overall methods are not provided here for purposes of simplicity. While summary method 200 and other disclosed methods can involve mounting a vibration sensor to an industrial motor, for example, it is also contemplated that the various disclosed methods can alternatively be applied to other types of mechanical components and mechanical assets.

After a start step 202, an initial process step 204 can involve placing an expansion subassembly into a threadless opening in a mechanical asset. The expansion subassembly can include an expandable insert having one or more expansion features, an expander, and an anchoring component having an anchoring feature that remains outside the threadless opening while the expansion features are placed within the threadless opening.

At a subsequent process step 206, the one or more expansion features can be actuated into one or more sidewalls of the threadless opening. Where the threadless opening is cylindrical in nature, this can be a single circular sidewall. Actuating the expansion feature(s) into the sidewall(s) can fasten the expansion subassembly to the mechanical asset, such as by generating outward radial forces that anchor the subassembly against the sidewall(s).

At the next process step 208, a locking subassembly can be positioned over the expansion subassembly. The locking subassembly can include an outer base, a locking component, and a threaded inner opening at a fixed location relative to the outer base. The locking subassembly can be positioned over the anchoring feature of the expansion subassembly.

Following process step 210 can involve locking the subassemblies together to finish forming the mounting assembly. This can include locking the locking component of the locking subassembly to the anchoring feature of the expansion subassembly to finish forming an expandable insert based mounting assembly including the locking subassembly and the expansion subassembly. Locking can also include suitably tightening the locking component to lock all subassemblies and components in place against the mechanical asset.

At a subsequent process step 212, the mechanical component can be coupled to the mounting assembly. This can be done, for example, by rotatably inserting a threaded portion of the mechanical component into a threaded inner opening of the mounting assembly insert while the insert is fitted within the mounting assembly sleeve inner volume such that the mechanical component is coupled to the mechanical asset at a specific rotational orientation relative to the mechanical asset.

Summary method 200 can then end at end step 214. As noted above, the mechanical component and mechanical asset can be separate items from each other and also separate from the mounting assembly, which can be used to mount one of these separate items to the other. In some arrangements, one or more of the foregoing steps can be performed simultaneously or in a different order. For example, step 208 can be performed before step 206. Not all steps are necessary in all situations, and additional steps and details can be added. For example, an added optional process step can involve forming the threadless opening in the mechanical asset. Further steps, details, and variations are provided in detailed method 1200 set forth below.

Figure 3A:
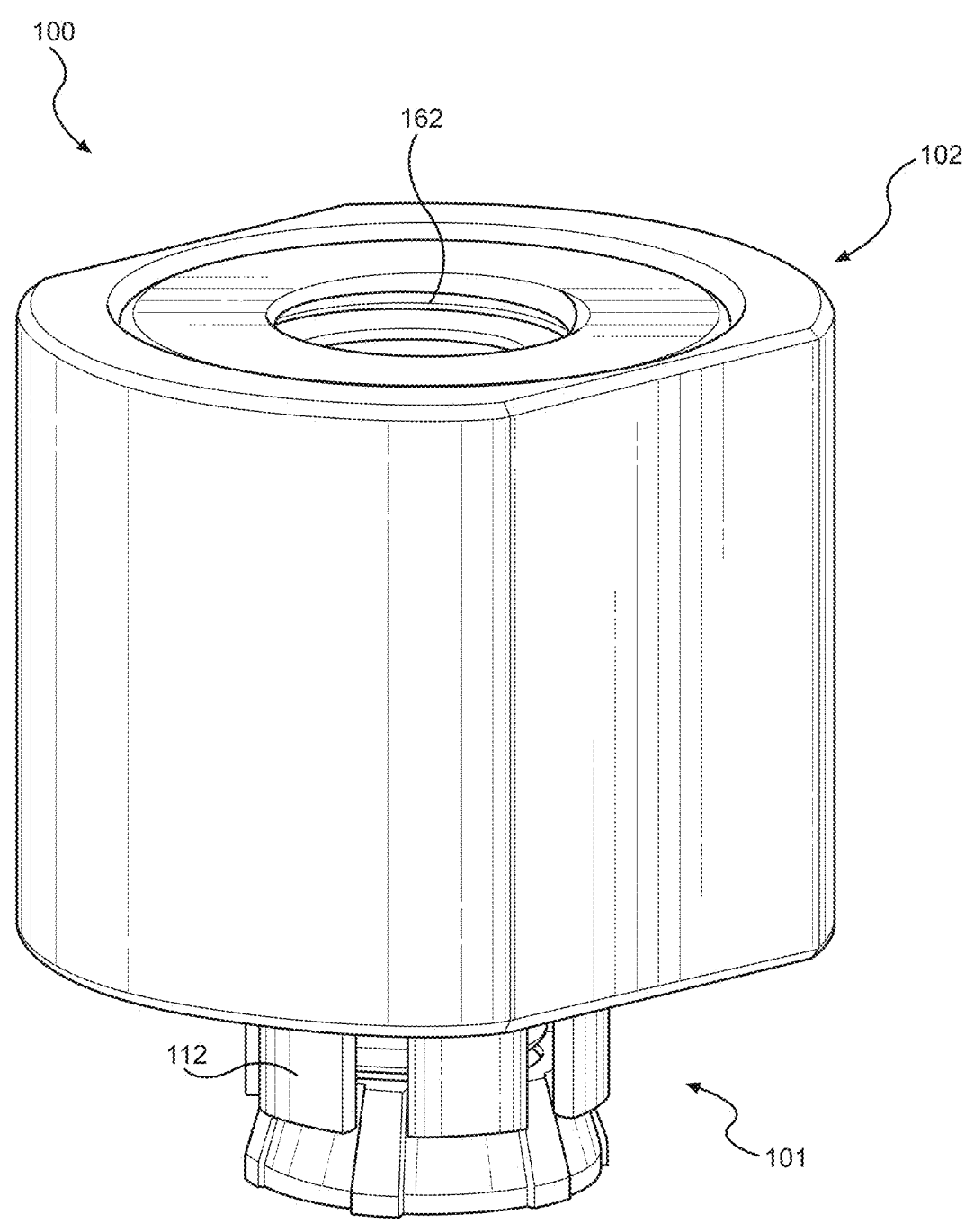
FIG. 3A illustrates in front perspective view an example expandable insert based mounting assembly according to one embodiment of the present disclosure.
Figure 3B:
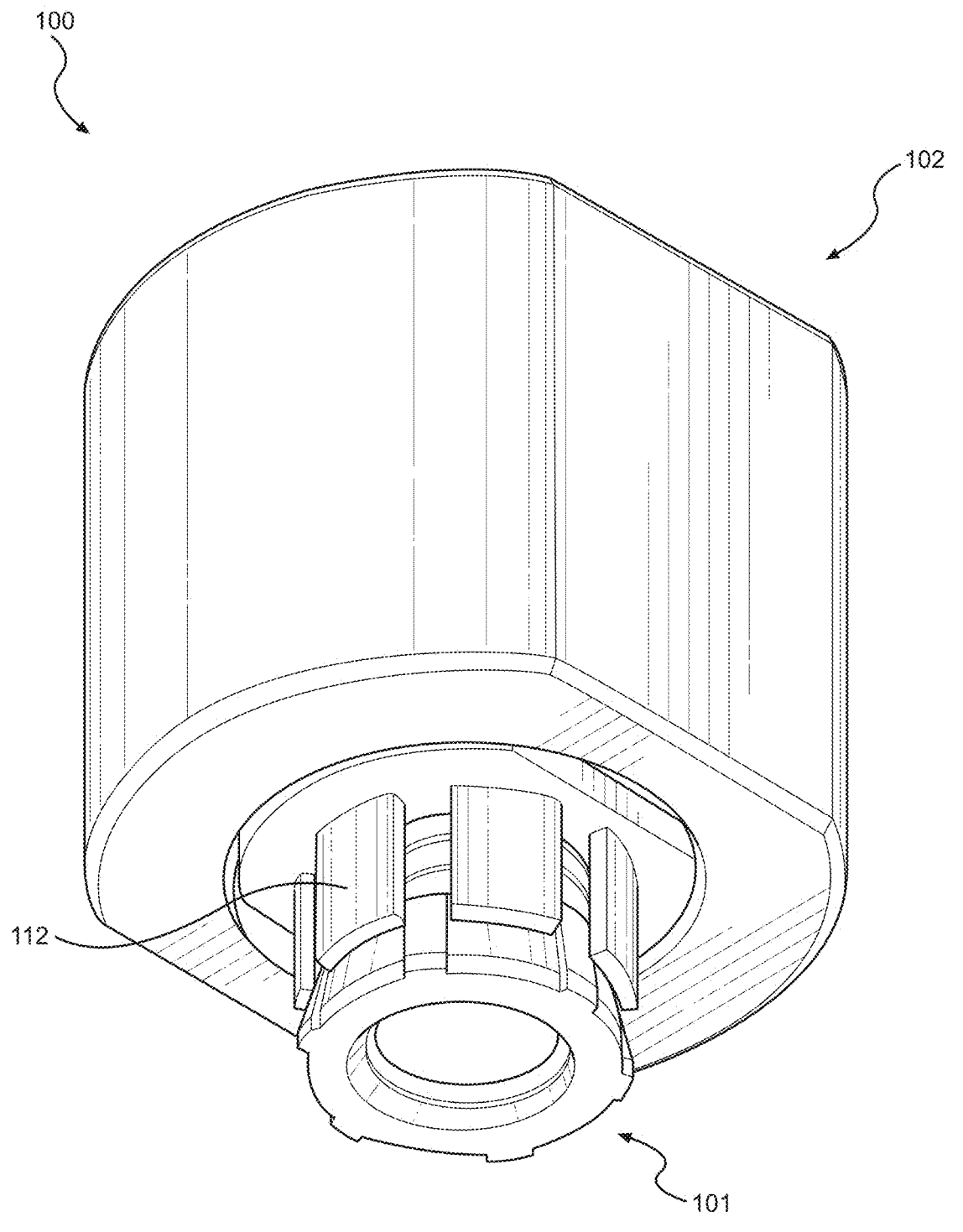
FIG. 3B illustrates in bottom perspective view the expandable insert based mounting assembly of FIG. 3A according to one embodiment of the present disclosure.
Figure 3C:
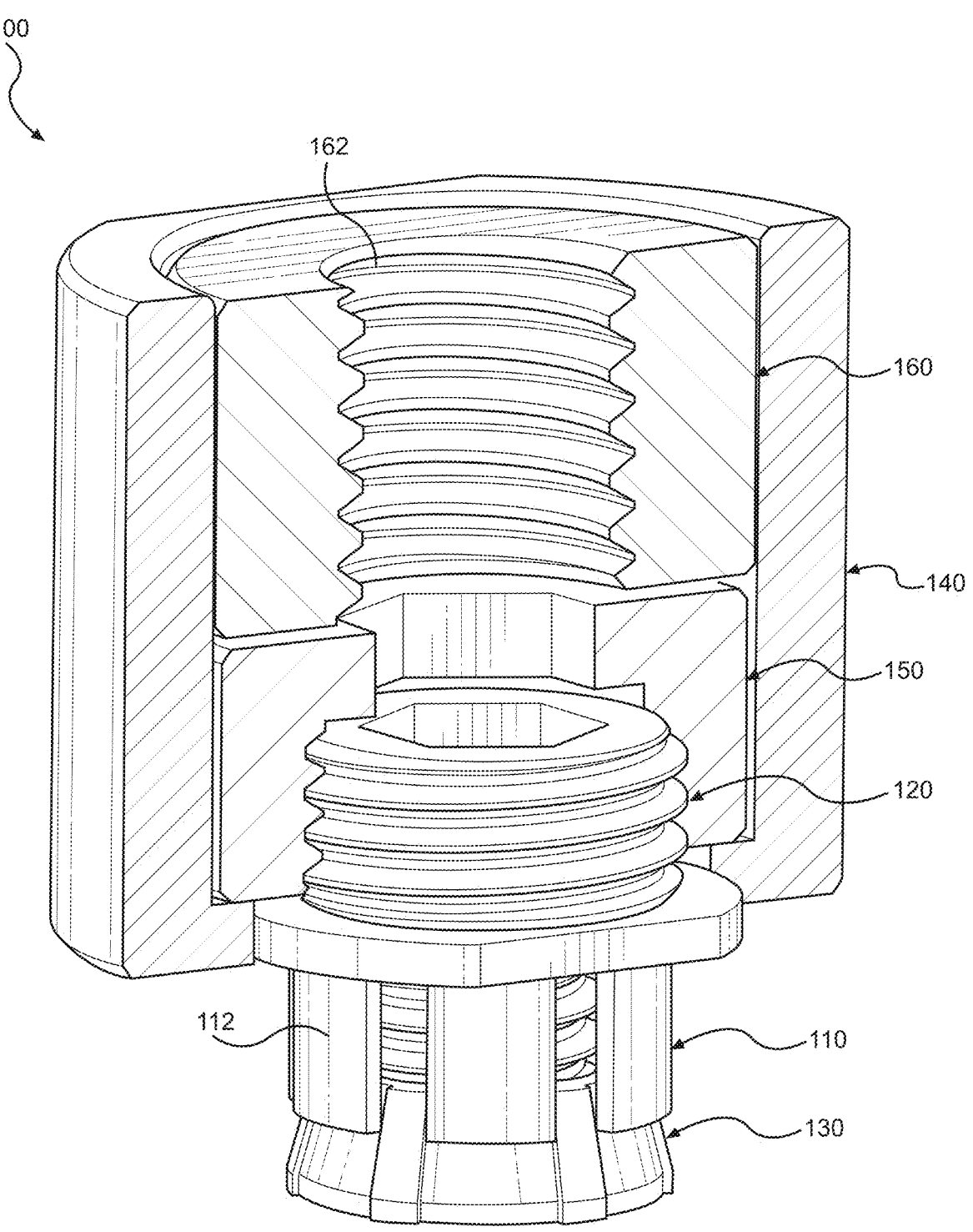
FIG. 3C illustrates in front perspective partial cross-section view the expandable insert based mounting assembly of FIG. 3A according to one embodiment of the present disclosure.

Continuing with FIGS. 3A-3C, an example expandable insert based mounting assembly is illustrated in front perspective, bottom perspective, and front perspective partial cross-section views respectively. Again, expandable insert based mounting assembly 100 can be configured to mount or otherwise couple a separate mechanical component to a separate mechanical asset, such as a vibration sensor to an industrial motor. Expandable insert based mounting assembly 100, which can also simply be called a mounting assembly, can include an expansion subassembly 101 and a locking subassembly 102, with these subassemblies being separate units that can be readily combined to form the overall mounting assembly 100. Expansion subassembly 101 can include expansion features, such as flexible tabs 112, that can be actuated into sidewalls of a threadless opening in a separate mechanical asset to fasten the expansion subassembly to the mechanical asset. Locking subassembly 102 can include threaded inner opening 162 that can be configured to receive a threaded portion of a separate mechanical component to facilitate coupling the mechanical component to the locking subassembly.

As shown in FIG. 3C, expandable insert based mounting assembly 100 can include various separate components, such as expandable insert 110, anchoring bolt 120, conical expander 130, sleeve 140, locking nut 150, and locking insert 160. The first three items 110, 120, 130 can form expansion subassembly 101, shown together in full, while the last three items 140, 150, 160 can form locking subassembly 102, shown together in cross-section. In general, flexible tabs 112 of expandable insert 110 can be pushed outward against mechanical asset threadless opening sidewalls to couple mounting assembly 100 to a separate mechanical asset, and threaded inner opening 162 of locking insert 160 can receive a mechanical component threaded portion to couple a separate mechanical component to mounting assembly 100 and thus to the mechanical asset. These and various other features, functionalities, and interactions between these components are set forth in greater detail below.

Next, FIGS. 4A-4D show an example expansion subassembly for an expandable insert based mounting assembly in top perspective, side elevation, bottom plan, and front perspective exploded views respectively. Expansion subassembly 101 can include expandable insert 110, anchoring bolt 120, and conical expander 130, which can mechanically interlock to form a subassembly unit that is separable from overall mounting assembly 100. Expandable insert 110 can include insert flange 111, flexible tabs 112, central opening 113 through the insert flange, and flat regions 114 along an outer circumference of the insert flange. Anchoring bolt 120 can include threaded portion 121 extending from threaded flange 122 and bolt tightening feature 123. Conical expander 130 can include conical outer surface 131, threaded central opening 132, and vertical ribs 133 protruding along the outer conical surface.

Expansion subassembly 101 can be installed into a threadless opening by placing insert flange 111 of expandable insert 110 across the top of the opening such that flexible tabs 112 extend into the opening. Threaded portion 121 of anchoring bolt 120 can extend through central opening 113 on expandable insert 110 and engage with threaded central opening 132 of conical expander 130, which can have its conical outer surface 131 set just below the distal edges of flexible tabs 112. Vertical ribs 133 can protrude to fill gaps between flexible tabs 112 such that conical expander 130 is unable to rotate relative to expandable insert 110. When anchoring bolt 120 is rotated in the proper direction, this can result in conical expander 130 being moved upward along threaded portion 121 due to the threaded mating arrangement of these components. This can move conical outer surface 131 upward and force contact against flexible tabs 112, which then pushes the flexible tabs outward as conical expander 130 continues to move upward. Further features, functionalities, and details for expansion subassembly 101 with expandable insert 110, anchoring bolt 120, and conical expander 130 are provided below.

Figure 4A:
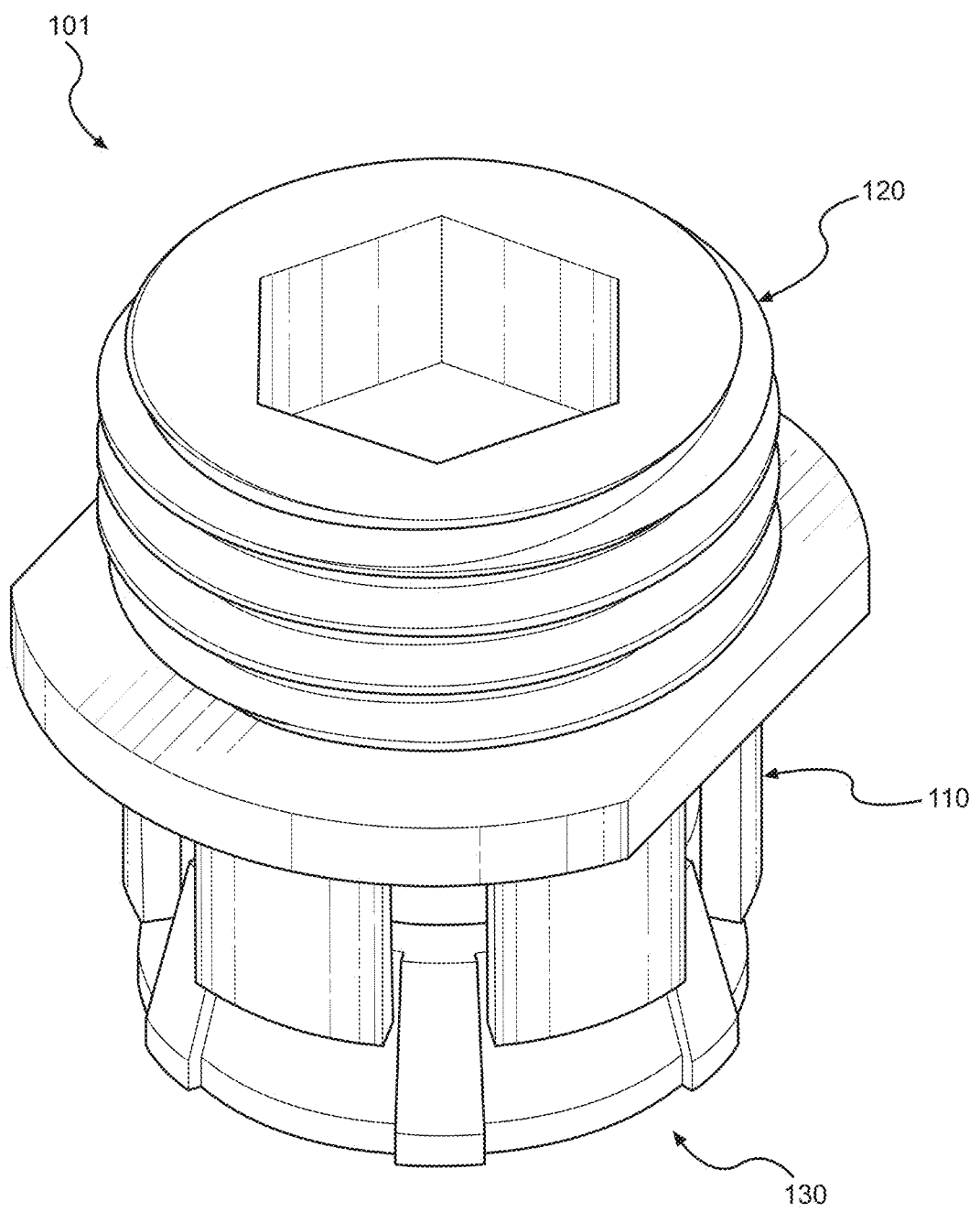
FIG. 4A illustrates in top perspective view an example expansion subassembly for an expandable insert based mounting assembly according to one embodiment of the present disclosure.
Figure 4B:
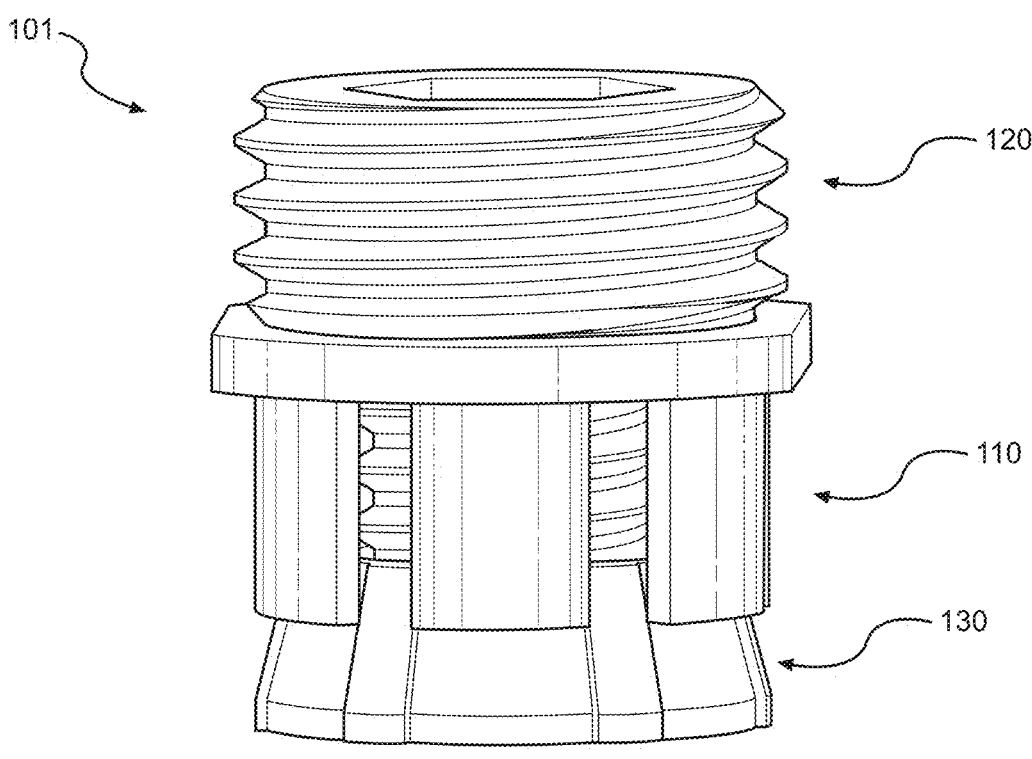
FIG. 4B illustrates in side elevation view the expansion subassembly of FIG. 4A according to one embodiment of the present disclosure.
Figure 4C:
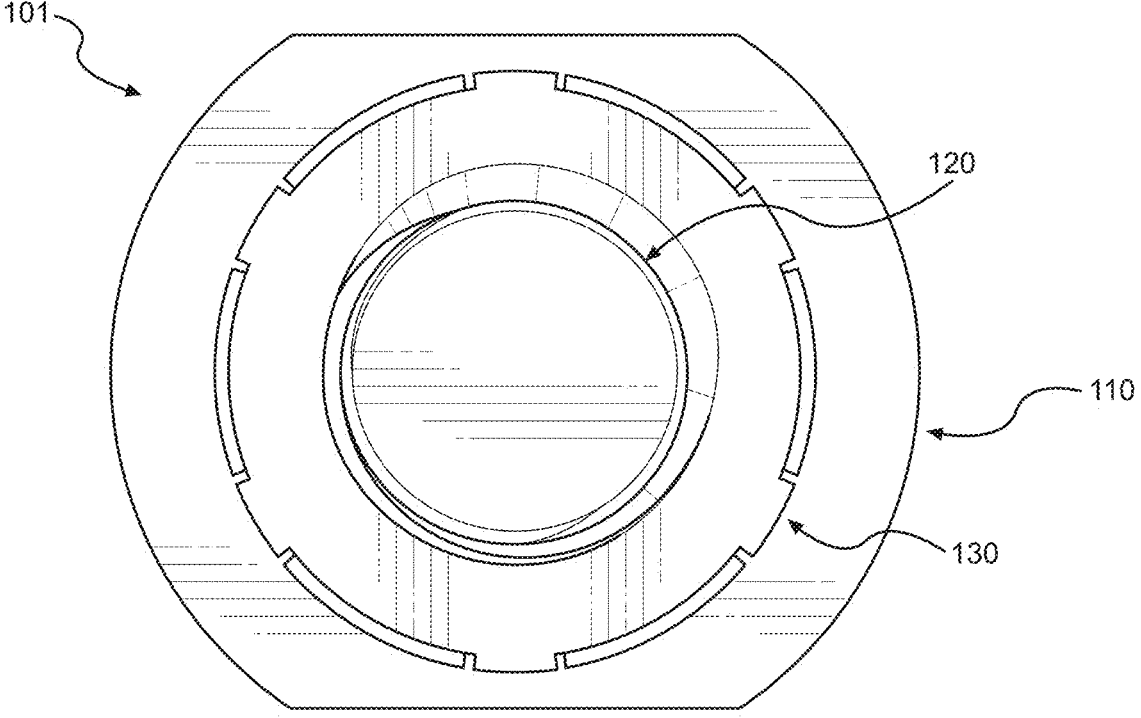
FIG. 4C illustrates in bottom plan view the expansion subassembly of FIG. 4A according to one embodiment of the present disclosure.
Figure 4D:
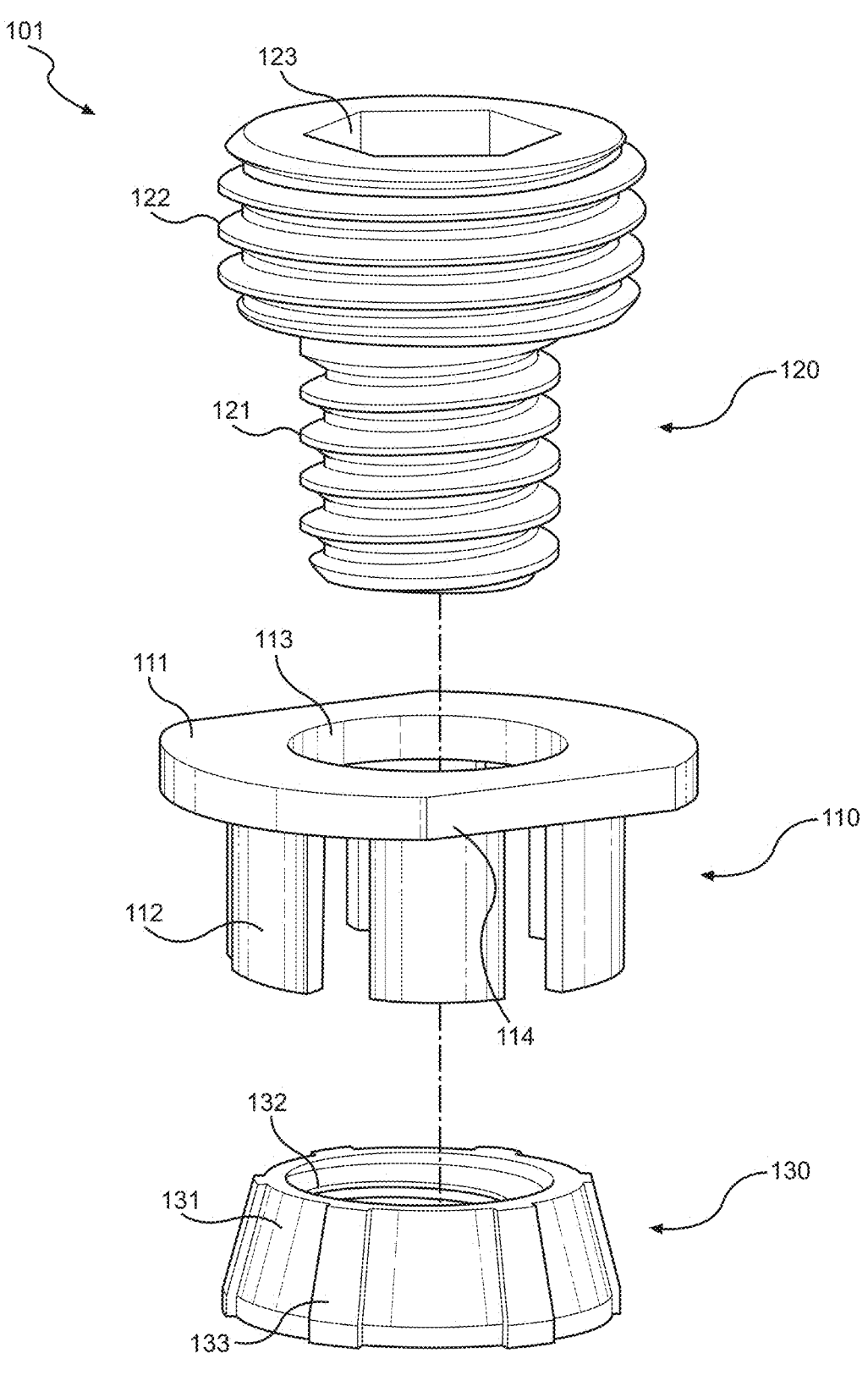
FIG. 4D illustrates in front perspective exploded view the expansion subassembly of FIG. 4A according to one embodiment of the present disclosure.
Figure 4E:
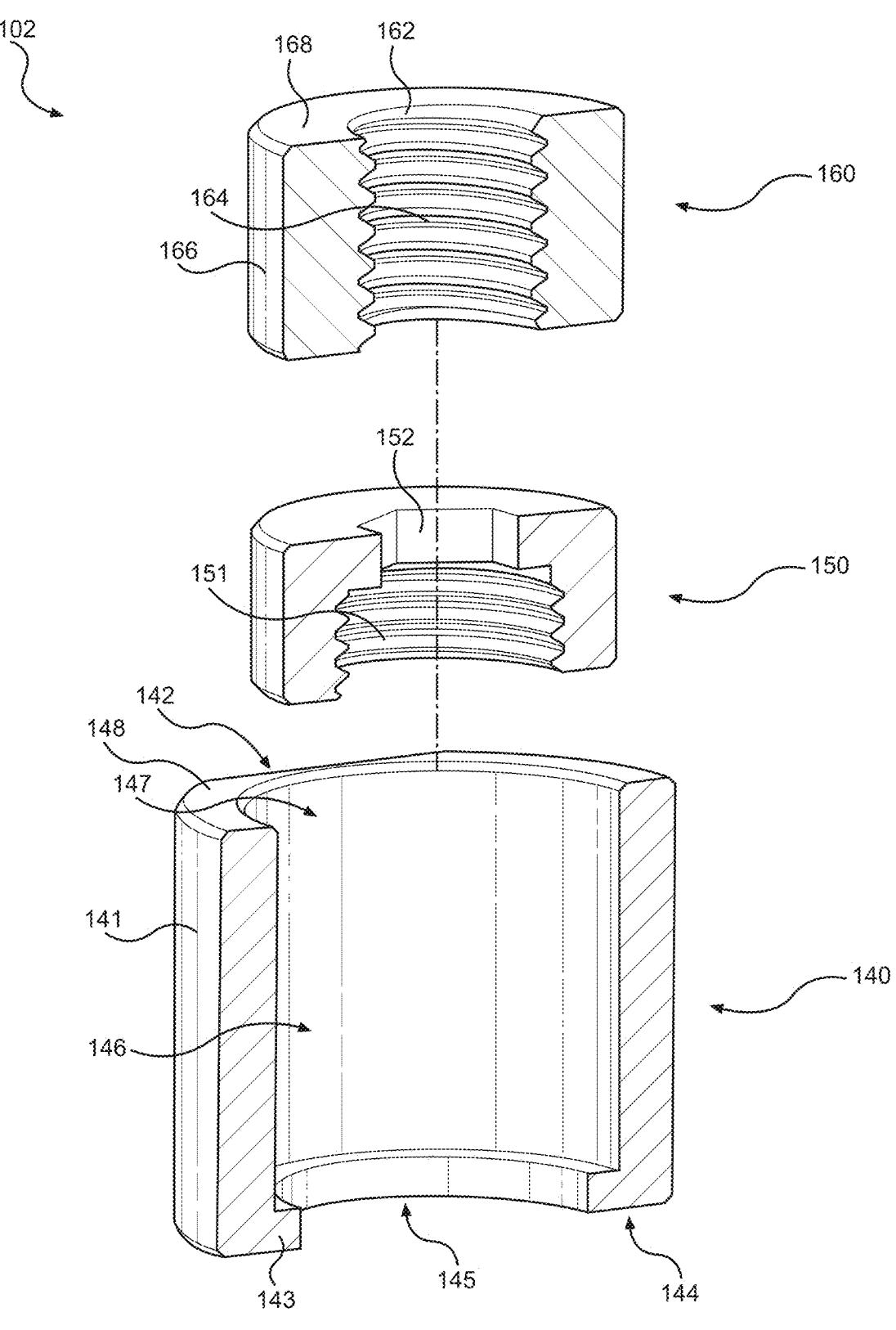
FIG. 4E illustrates in front perspective cross-section exploded view an example locking subassembly for an expandable insert based mounting assembly according to one embodiment of the present disclosure.

FIG. 4E illustrates in front perspective cross-section exploded view an example locking subassembly for an expandable insert based mounting assembly. Locking subassembly 102 can include sleeve 140, locking nut 150, and locking insert 160, which can mechanically interlock to form a subassembly unit that is separable from overall mounting assembly 100. Sleeve 140 can include one or more walls 141 coupled to an endcap 143 at a bottom end thereof to define an inner volume 146 having an open end or "sleeve opening" 147 at a top end opposite the endcap, with a sleeve upper surface 148 surrounding the sleeve opening. Endcap 143 can include a bottom surface 144 and an endcap opening 145 configured to be placed over the expansion subassembly such that its threaded flange extends into the inner volume 146. The one or more walls 141 can define an outer surface that includes at least one pair of opposing flat regions 142, which can be sized and shaped to accommodate a standard size wrench or tool to facilitate a controlled rotation or held position for sleeve 140.

Locking nut 150 can include an internal thread 151 configured to be coupled onto the threaded flange of the anchoring bolt and a nut tightening feature 152 at a top surface of the locking nut. Locking nut 150 can have an outer diameter that is greater than the diameter of endcap opening 145 but less than the diameter of inner volume 146 such that the locking nut is configured to be contained and rotatable within the inner volume of sleeve 140. Nut tightening feature 152 can be configured to facilitate rotation of locking nut 150 such that the locking nut can be rotatably tightened onto the anchoring bolt to clamp endcap 143 against the separate mechanical asset and lock sleeve 140 in place.

Locking insert 160 can include a threaded inner opening 162 having a thread 164, outer wall surface 166, and locking insert upper surface 168. Locking insert 160 can be press fit, friction fitted, or otherwise placed within sleeve opening 147 so that the locking insert is rigidly coupled to sleeve 140 within the sleeve opening in a manner such that the locking insert is laterally and rotationally fixed with respect to the sleeve, and such that locking nut 150 is fully constrained within inner volume 146. Threaded inner opening 162 can be configured to accept a rotational insertion therein of a threaded portion of a separate mechanical component, such as that which is shown in FIG. 1B above, such that the separate mechanical component is mounted to the separate mechanical asset at a specific rotational orientation relative to the separate mechanical asset.

Figure 5A:
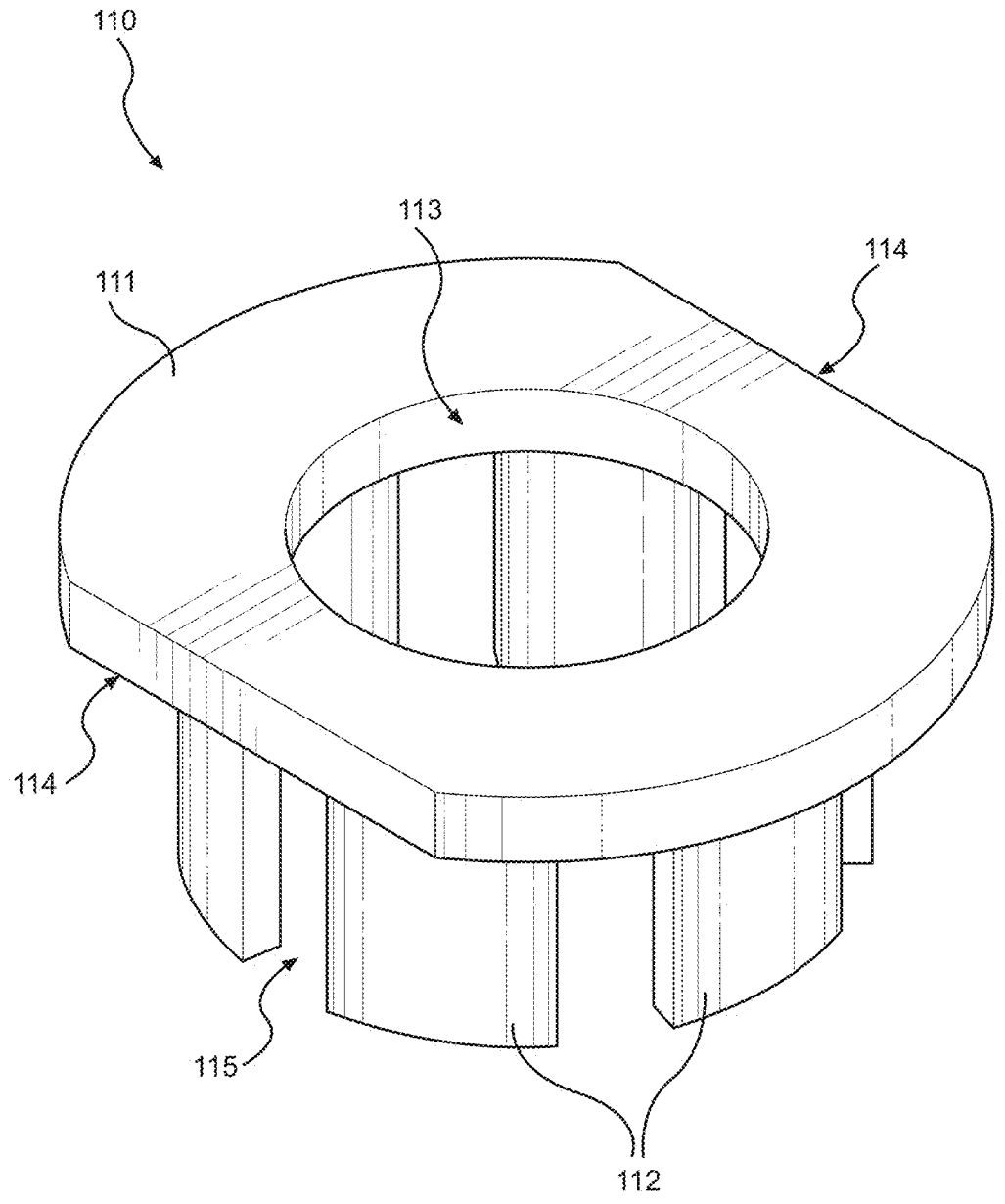
FIG. 5A illustrates in top perspective view an example expandable insert for an expandable insert based mounting assembly according to one embodiment of the present disclosure.
Figure 5B:
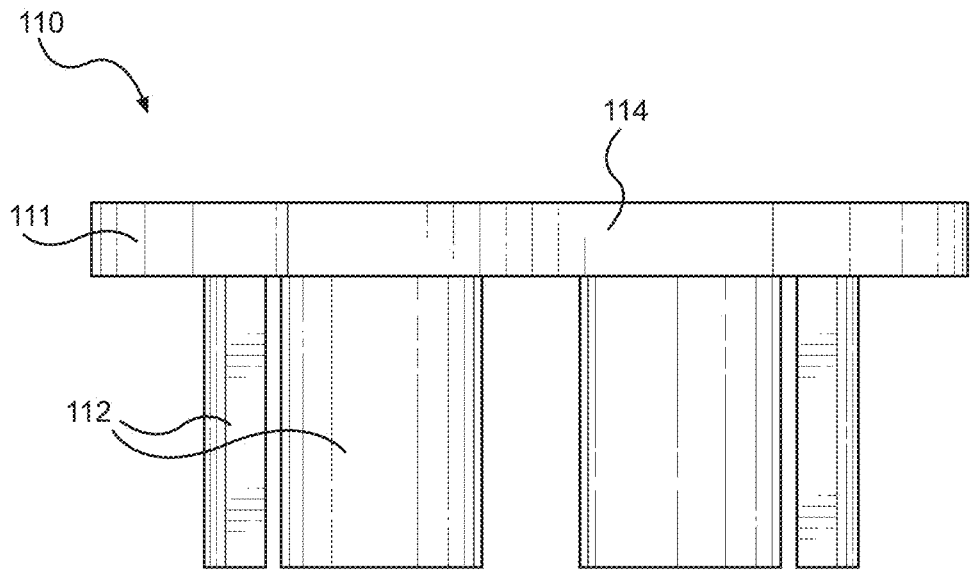
FIG. 5B illustrates in side elevation view the expandable insert of FIG. 5A according to one embodiment of the present disclosure.
Figure 5C:
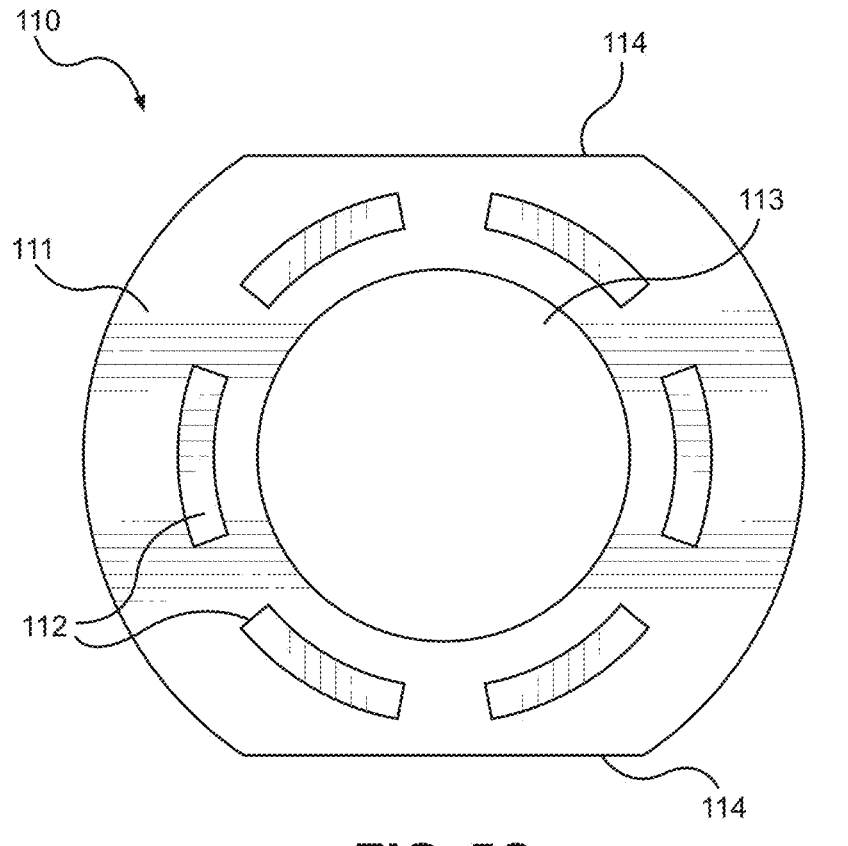
FIG. 5C illustrates in bottom plan view the expandable insert of FIG. 5A according to one embodiment of the present disclosure.

Continuing with FIGS. 5A-5C, an example expandable insert for an expandable insert based mounting assembly is illustrated in top perspective, side elevation, and bottom plan views respectively. Expandable insert 110 can include insert flange 111 having a central opening 113 and one or more flexible tabs 112 arranged around the central opening and extending downward from the insert flange, among other possible features. Expandable insert 110 can be configured to be placed across a threadless opening in a separate mechanical asset such that insert flange 111 remains above the threadless opening and flexible tabs 112 extend into the threadless opening. Flexible tabs 112 can be configured to be pushed outward into one or more sidewalls of the threadless opening. Although six flexible tabs 112 are shown, it will be readily appreciated that more or fewer flexible tabs can be used. In some arrangements, a single flexible tab can be used, which can form a thin cylinder extending from the insert flange, although multiple tabs may be more effective.

Central opening 113 can be sized and shaped such that the threaded portion of the anchoring bolt can extend through the central opening while the threaded flange of the anchoring bolt is too large and abuts expandable insert 110 at its upper surface. Flat regions 114 along the outer circumference of insert flange 111 can facilitate the use of a wrench or other suitable tool to hold expandable insert in place, such as to prevent rotation while the anchoring bolt is being rotated. Gaps 115 between flexible tabs 112 can facilitate greater independence of the flexible tabs from each other to allow for different tab movements and expansions. Gaps 115 can also be sized and shaped to accommodate vertical ribs of the conical expander to fit therein, with contact between the vertical ribs and flexible tabs 112 serving to prevent rotation of the conical expander relative to expandable insert 110. Expandable insert 110 and all of its features can be integrally formed from any suitable material, such as steel, for example.

Figure 6A:
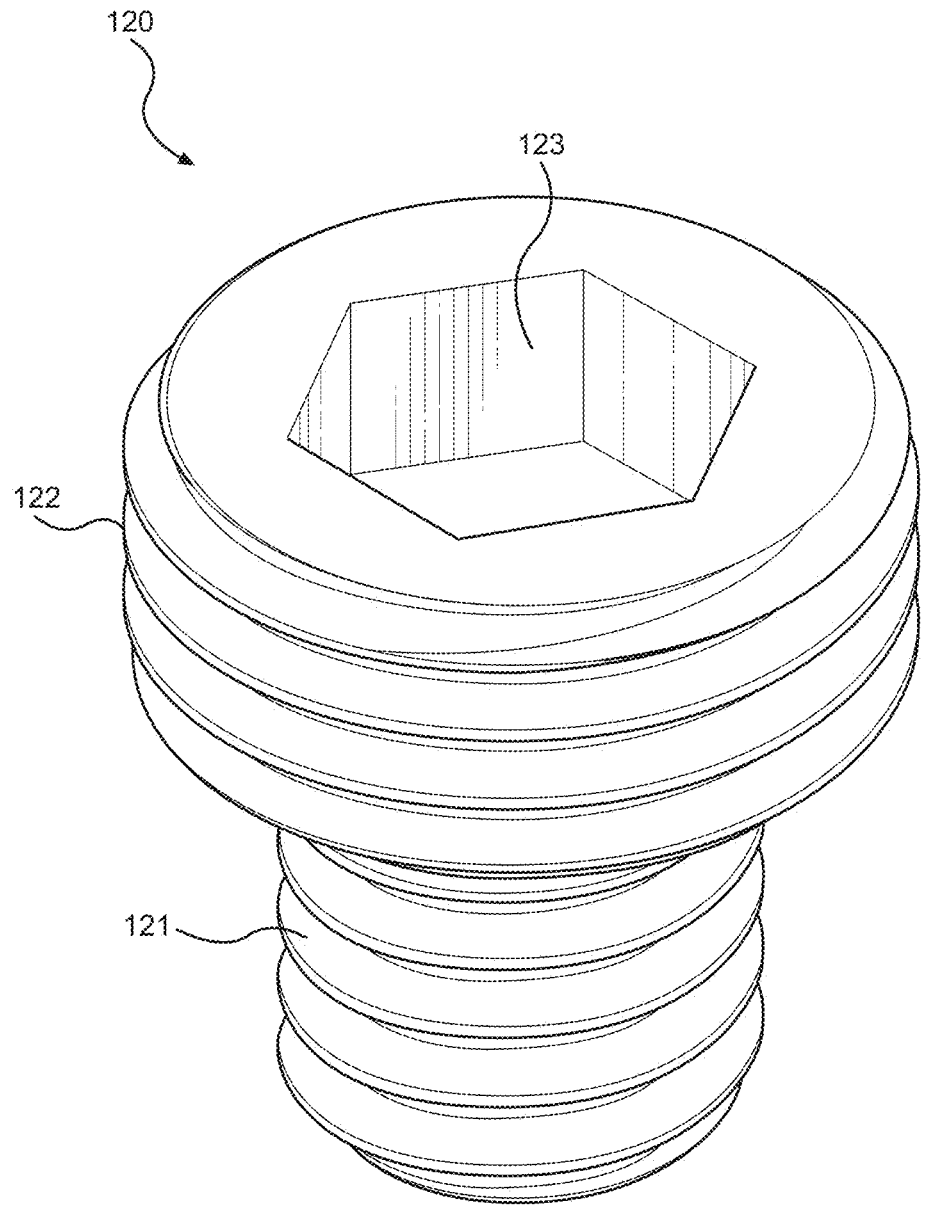
FIG. 6A illustrates in top perspective view an example anchoring bolt for an expandable insert based mounting assembly according to one embodiment of the present disclosure.
Figure 6B:
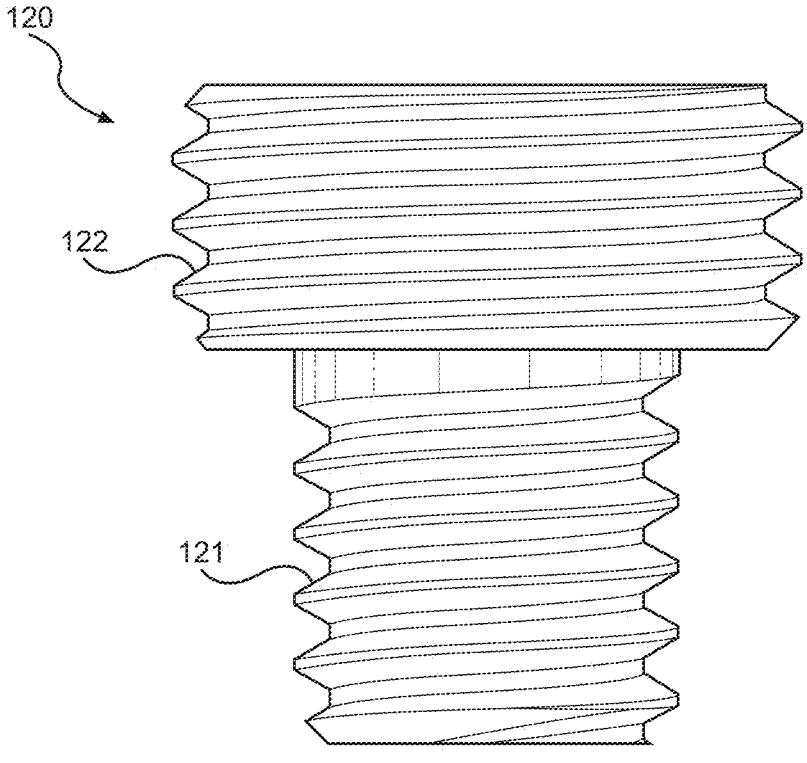
FIG. 6B illustrates in side elevation view the anchoring bolt of FIG. 6A according to one embodiment of the present disclosure.
Figure 6C:
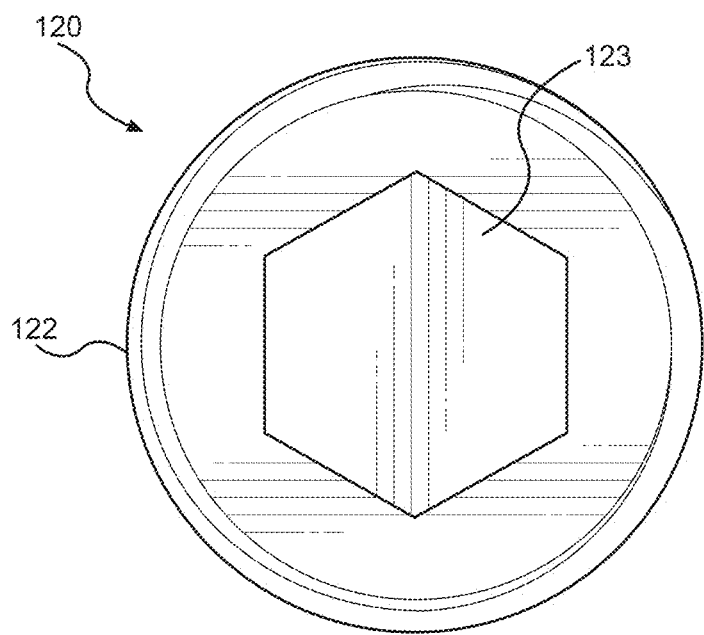
FIG. 6C illustrates in top plan view the anchoring bolt of FIG. 6A according to one embodiment of the present disclosure.

FIGS. 6A-6C illustrate an example anchoring bolt for an expandable insert based mounting assembly in top perspective, side elevation, and top plan views respectively. Anchoring bolt 120, which can also be called a double threaded bolt or simply an anchoring component, can include threaded portion 121 extending from threaded flange 122 and bolt tightening feature 123, among other possible features. Threaded protrusion 121 can define a first diameter and threaded flange 122 can define a second diameter that is greater than the first diameter. These relative diameters can result in threaded protrusion 121 extending through the insert flange central opening of the expandable insert and between the one or more flexible tabs, while threaded flange 122 has a diameter greater than the diameter of the insert flange central opening such that the threaded flange rests above the insert flange.

Threaded protrusion 121 can have a thread configured to mate with a corresponding thread on the conical expander, while threaded flange 122 can have a thread configured to mate with a corresponding thread on the locking nut. Threaded flange 122 can function as an anchoring feature since it is used to anchor or otherwise couple the locking subassembly to the expansion subassembly. In some specific arrangements, threaded protrusion 121 can form an M6 threaded bolt arrangement with a 6 mm diameter, for example, while threaded flange 122 can form an M10 threaded bolt arrangement with a 10 mm diameter. Other bolt dimensions are also possible. Bolt tightening feature 123 can be used to rotate and tighten anchoring bolt 120, which can be done to move the conical expander along threaded protrusion 121 before mating the locking nut onto threaded flange 122. Bolt tightening feature 123 can be, for example, a 5 mm hex opening on a top surface of anchoring bolt 120. Other hex sizes or bolt tightening features can alternatively be used. Anchoring bolt 120 and all of its features can be integrally formed from any suitable material, such as steel, for example.

Figure 7A:
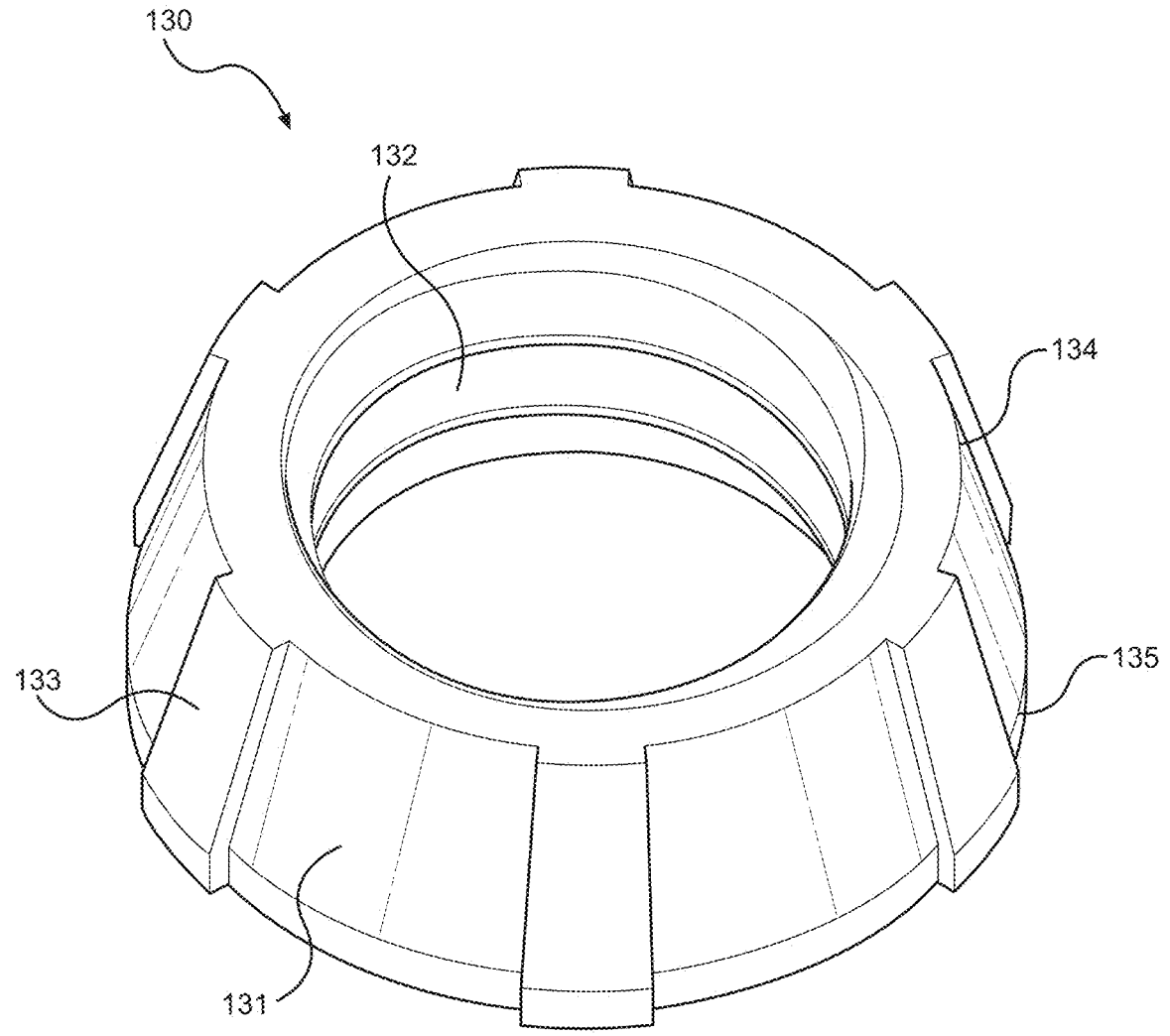
FIG. 7A illustrates in top perspective view an example conical expander for an expandable insert based mounting assembly according to one embodiment of the present disclosure.
Figure 7B:
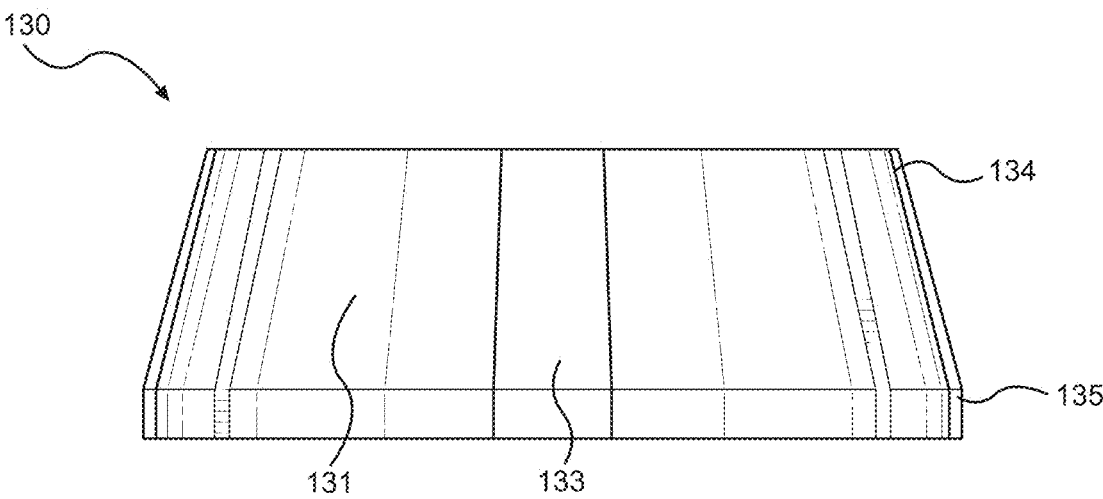
FIG. 7B illustrates in side elevation view the conical expander of FIG. 7A according to one embodiment of the present disclosure.
Figure 7C:
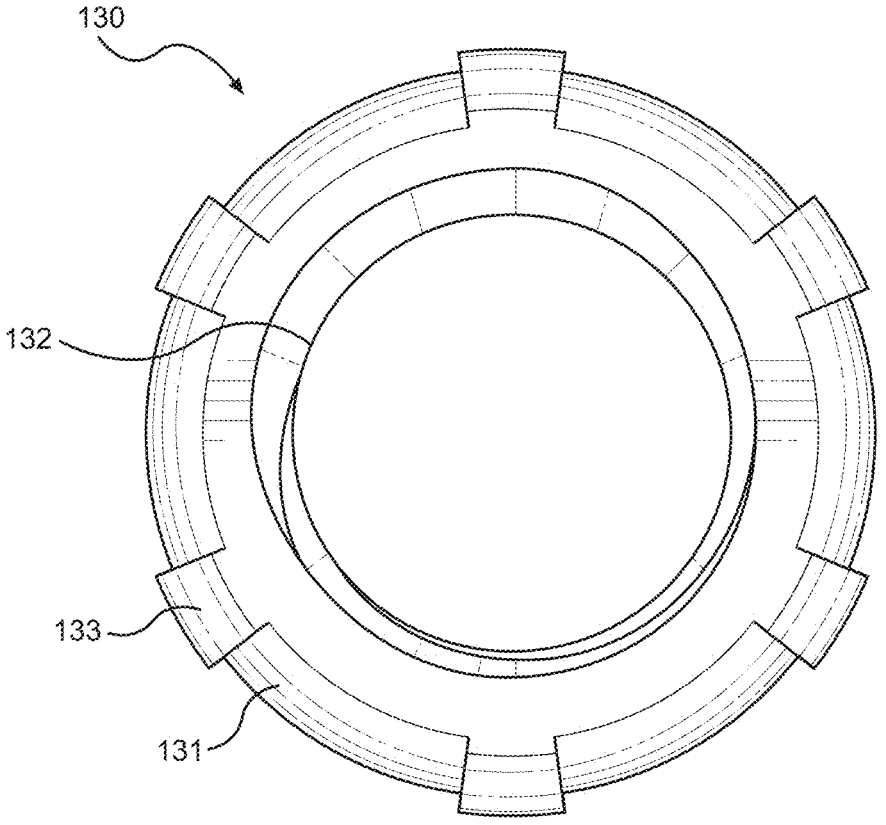
FIG. 7C illustrates in top plan view the conical expander of FIG. 7A according to one embodiment of the present disclosure.

FIGS. 7A-7C illustrate an example conical expander for an expandable insert based mounting assembly in top perspective, side elevation, and top plan views respectively. Conical expander 130, which can also be called an expander or simply an actuator, can include a conical outer surface 131, threaded central opening 132, and vertical ribs 133, among other possible features. As shown, conical outer surface 131 can have a top outer diameter 134 that is smaller than a bottom outer diameter 135. Threaded central opening 132 can extend through the entire conical expander 130 and can mate or couple onto the threaded protrusion of the anchoring bolt.

Conical expander 130 can be configured such that rotating the anchoring bolt results in pulling the conical expander upward along the threaded protrusion toward the insert flange. This can then result in the conical outer surface 131 contacting and pushing the flexible tabs outward until the flexible tabs are pushed into the sidewall of the threadless opening to fasten the expandable insert, anchoring bolt, and conical flange to the separate mechanical asset. Conical expander 130 and all of its features can be integrally formed from any suitable material, such as steel, for example.

Figure 8A:
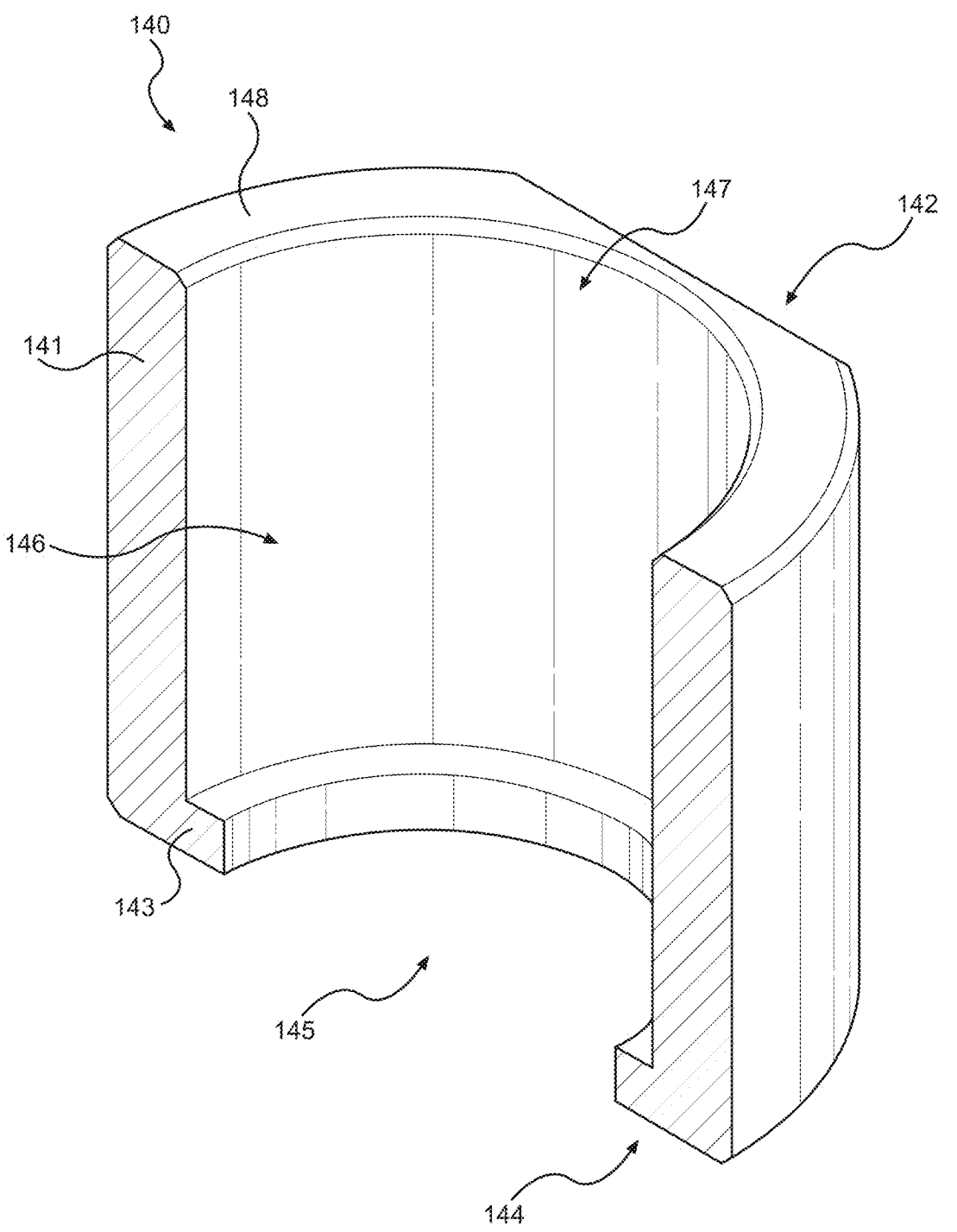
FIG. 8A illustrates in top perspective cross-section view an example sleeve for an expandable insert based mounting assembly according to one embodiment of the present disclosure.
Figure 8B:
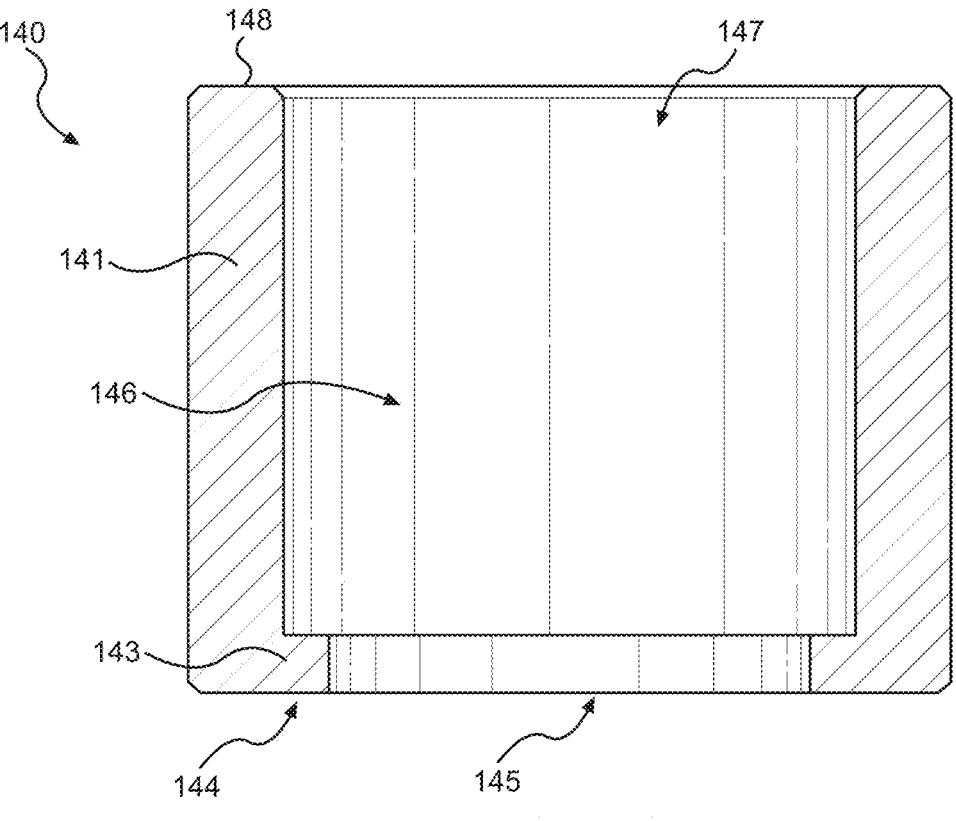
FIG. 8B illustrates in side elevation cross-section view the sleeve of FIG. 8A according to one embodiment of the present disclosure.
Figure 8C:
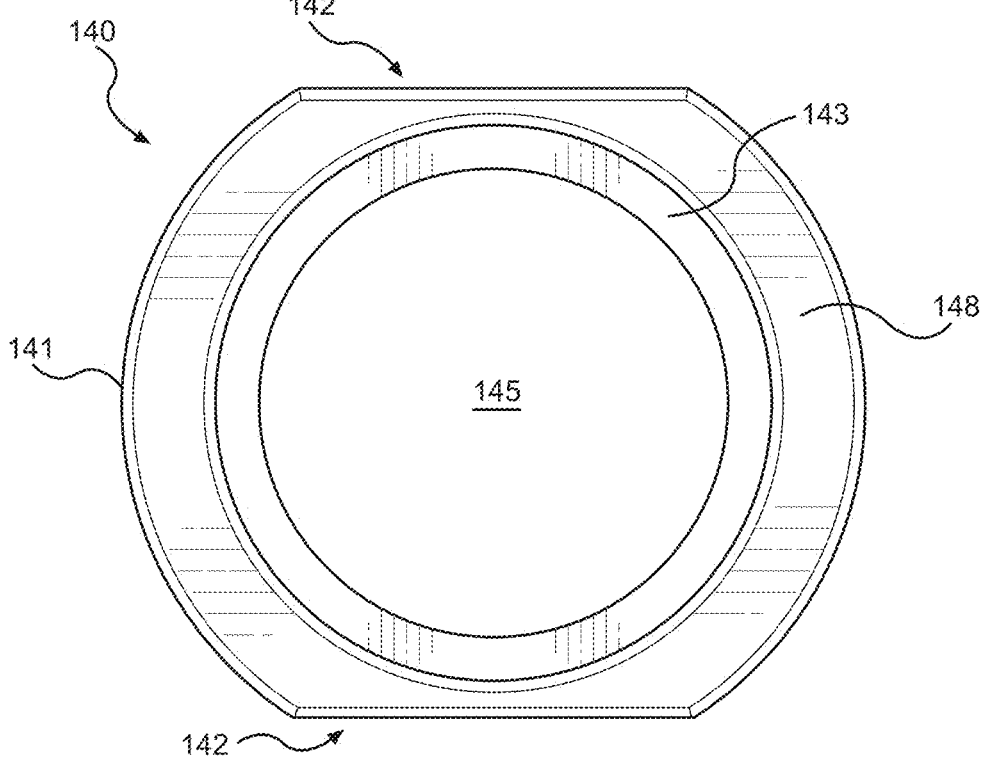
FIG. 8C illustrates in top plan view the sleeve of FIG. 8A according to one embodiment of the present disclosure.

FIGS. 8A-8C illustrate an example sleeve for an expandable insert based mounting assembly in top perspective cross-section, side elevation cross-section, and top plan views respectively. In some arrangements, sleeve 140 can be similar to the sleeve disclosed in commonly owned U.S. patent application Ser. No. 19/297,904, which application is again hereby incorporated by reference herein. Sleeve 140 can include one or more walls 141 coupled to an endcap 143 at a bottom end thereof to define an inner volume 146 having an open end or sleeve opening 147 at a top end opposite the endcap, with a sleeve upper surface 148 surrounding the sleeve opening. Endcap 143 can include a bottom surface 144 configured to contact an outer surface of the separate mechanical asset and an endcap opening 145 configured to be placed over the insert flange and anchoring bolt threaded flange of the expansion subassembly such that the threaded flange extends into the inner volume 146. A single fully or partially circular wall 141 can form around an outer circumference of sleeve 140, and the one or more walls of the sleeve can define an outer surface that includes at least one pair of opposing flat regions 142, which can be sized and shaped to accommodate a standard size wrench or tool to facilitate a controlled rotation or held position for sleeve 140.

In various arrangements, sleeve upper surface 148 can be configured to contact and provide a physical stop of sleeve 140 against a bottom surface of the separate mechanical component when the threaded portion of the separate mechanical component is inserted into and sufficiently rotated within the threaded inner opening of the locking insert. Various aspects and features of the locking insert can be configured to facilitate this arrangement and the coupling of the locking insert within the sleeve, as set forth in greater detail below. Sleeve 140 and all of its features can be integrally formed from any suitable material, such as steel, for example.

Figure 9A:
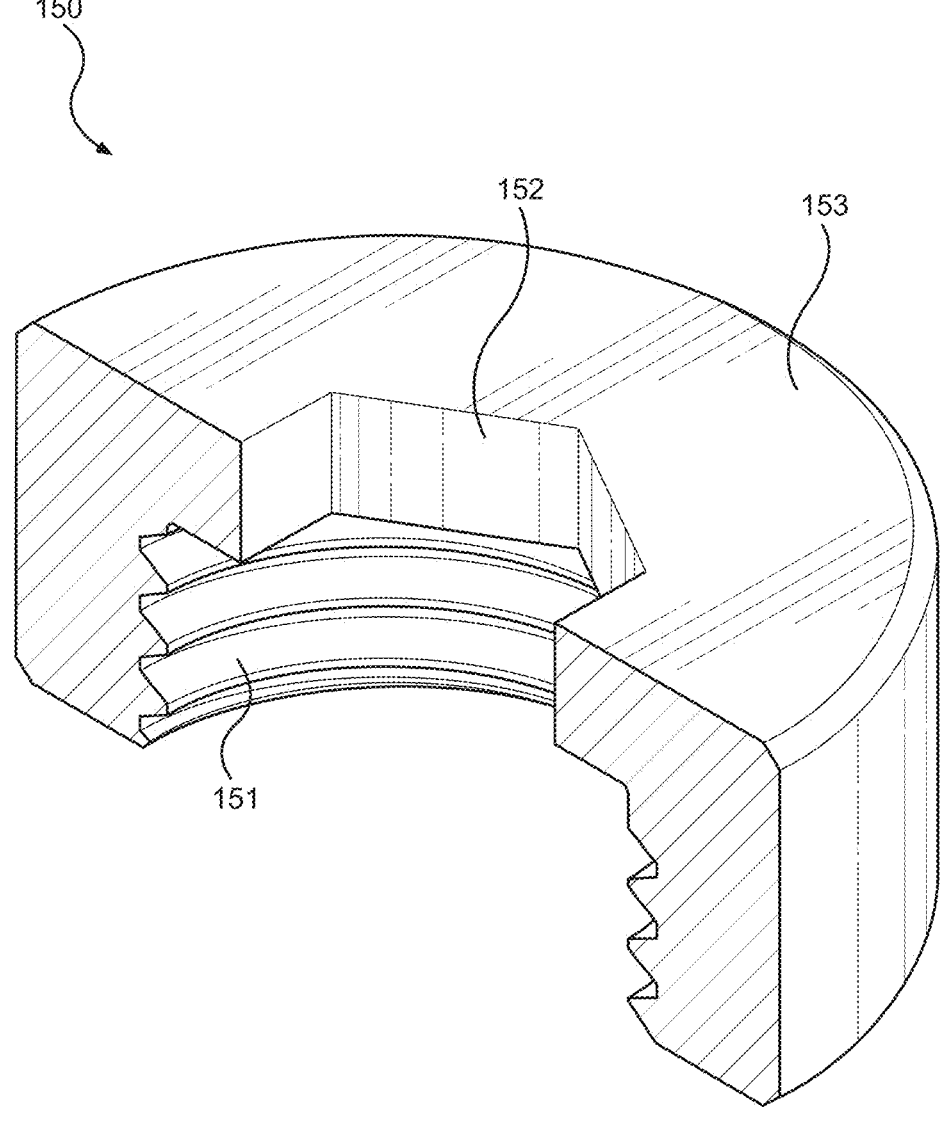
FIG. 9A illustrates in top perspective cross-section view an example locking nut for an expandable insert based mounting assembly according to one embodiment of the present disclosure.
Figure 9B:
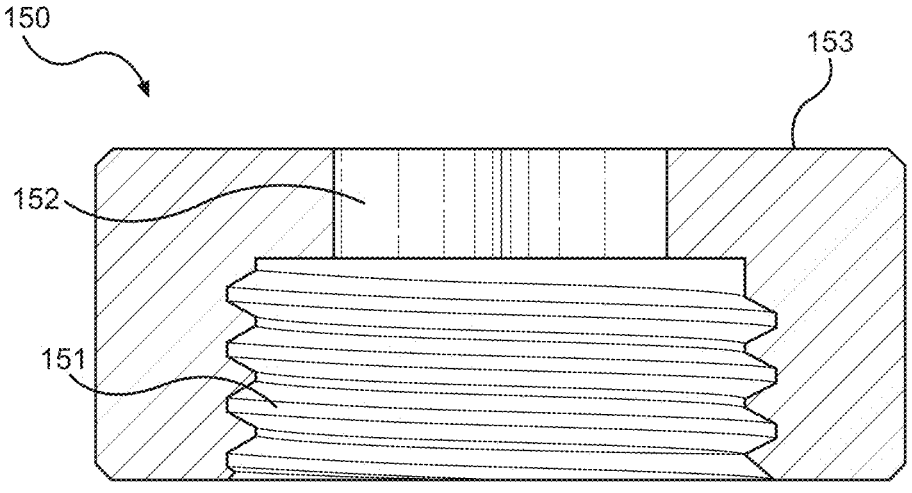
FIG. 9B illustrates in side elevation cross-section view the locking nut of FIG. 9A according to one embodiment of the present disclosure.
Figure 9C:
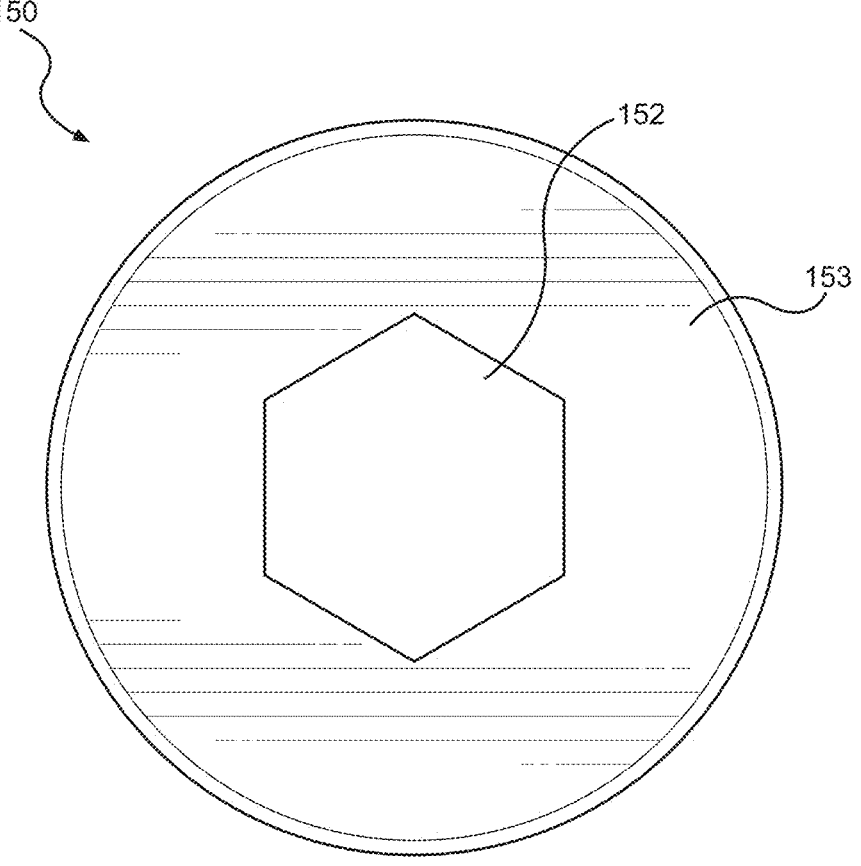
FIG. 9C illustrates in top plan view the locking nut of FIG. 9A according to one embodiment of the present disclosure.

FIGS. 9A-9C illustrate an example locking nut for an expandable insert based mounting assembly in top perspective cross-section, side elevation cross-section, and top plan views respectively. Locking nut 150 can include an internal thread 151 and a nut tightening feature 152 at a top surface 153, among other possible features. Internal thread 151 can be configured to mate with or be coupled onto a corresponding thread on the threaded flange of the anchoring bolt. Locking nut 150 can have an outer diameter that is greater than the diameter of the endcap opening 145 but less than the diameter of the sleeve inner volume 146, such that the locking nut is configured to be contained and rotatable within the inner volume of the sleeve without falling through the endcap opening.

Nut tightening feature 152 can be configured to facilitate rotation of locking nut 150 such that the locking nut can be rotatably tightened onto the anchoring bolt to clamp endcap 143 against the separate mechanical asset and lock sleeve 140 in place. Nut tightening feature 152 can be, for example, a 10 mm hex opening on a top surface 153 of locking nut 150. Other hex sizes or bolt tightening features can alternatively be used. In some arrangements, nut tightening features 152 can have a larger diameter than bolt tightening feature detailed above, such that the bolt tightening feature is readily accessible through the locking nut while the locking nut is installed. Locking nut 150 and all of its features can be integrally formed from any suitable material, such as steel, for example.

Figure 10A:
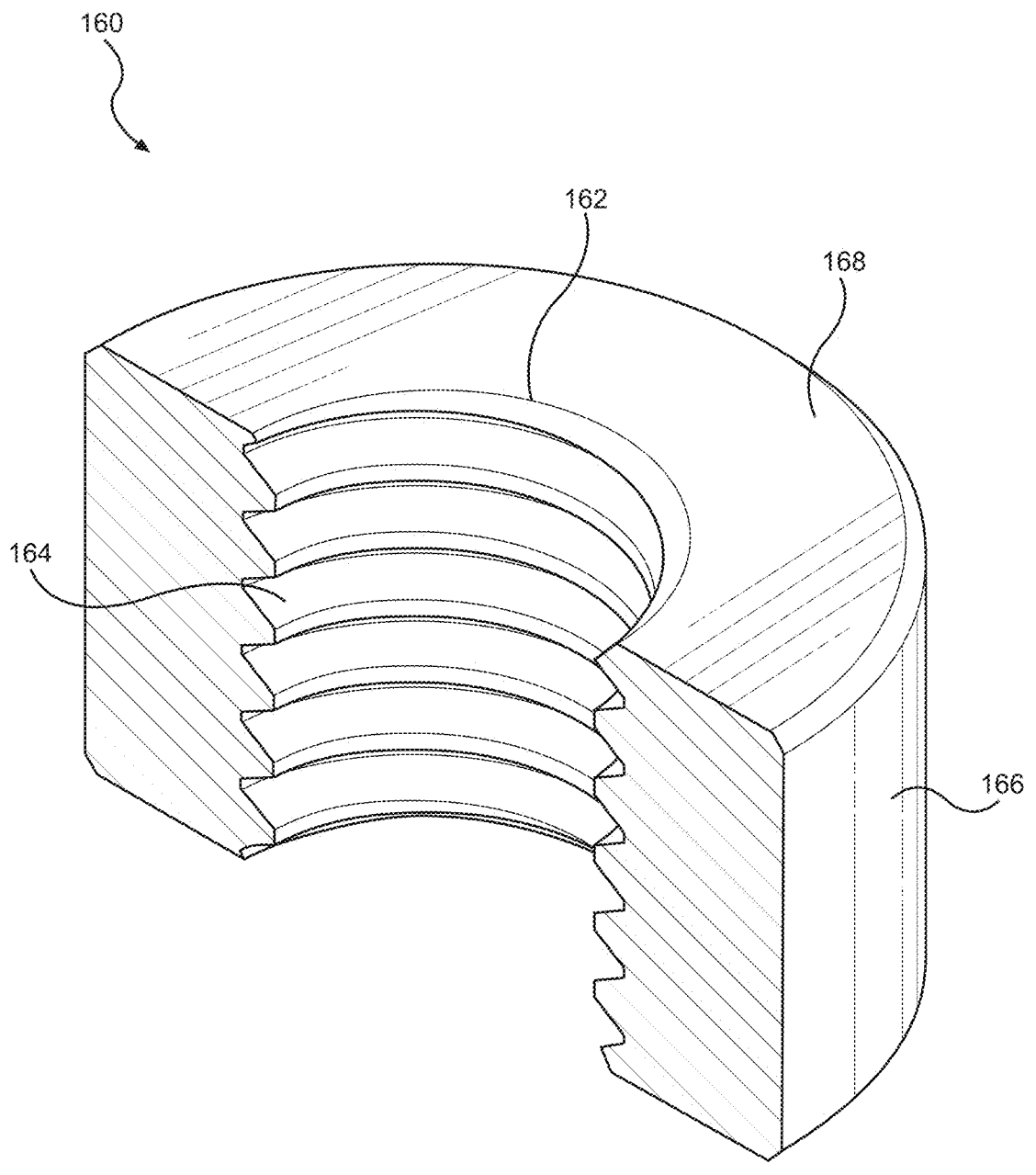
FIG. 10A illustrates in top perspective cross-section view an example locking insert for an expandable insert based mounting assembly according to one embodiment of the present disclosure.
Figure 10B:
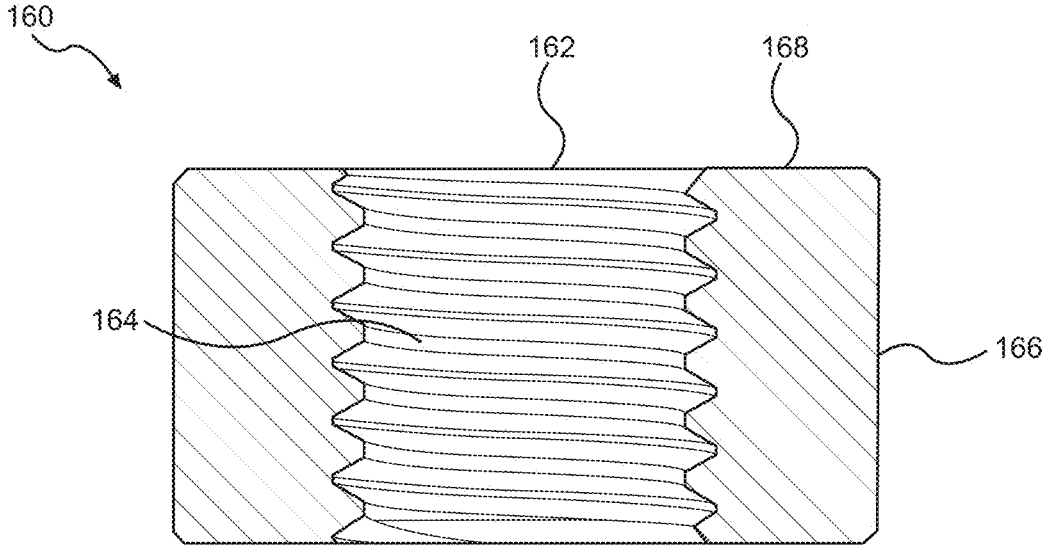
FIG. 10B illustrates in side elevation cross-section view the locking insert of FIG. 10A according to one embodiment of the present disclosure.
Figure 10C:
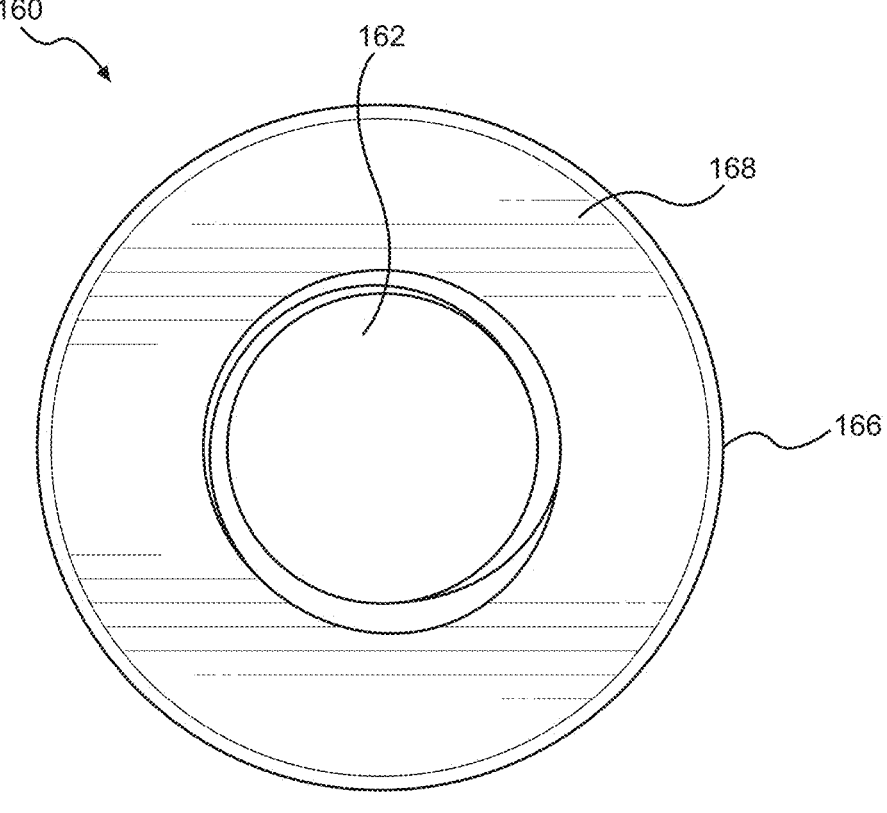
FIG. 10C illustrates in top plan view the locking insert of FIG. 10A according to one embodiment of the present disclosure.

FIGS. 10A-10C illustrate an example locking insert for an expandable insert based mounting assembly in top perspective cross-section, side elevation cross-section, and top plan views respectively. In some arrangements, locking insert 160 can be identical or substantially similar to the insert disclosed in commonly owned U.S. patent application Ser. No. 19/297,904, which application is again hereby incorporated by reference herein. Locking insert 160 can include a threaded inner opening 162 having a thread 164, outer wall surface 166, and locking insert upper surface 168, among other possible features. As noted above, locking insert 160 can be fitted within the sleeve opening such that the locking insert is unable to move relative to the sleeve and such that the locking nut is fully constrained within the inner volume. Again, threaded inner opening 162 can be configured to accept a rotational insertion therein of a threaded portion of a separate mechanical component such that the separate mechanical component is mounted to the separate mechanical asset at a specific rotational orientation relative to the separate mechanical asset. Locking insert 160 and all of its features can be integrally formed from any suitable material, such as steel, for example.

In various embodiments, installation of mechanical component 10 to mounting assembly 100 can involve a bottom surface of the mechanical component contacting and torquing against sleeve upper surface 148 of the mounting assembly. Due to the size, shape, and geometry of sleeve 140, this can sometimes result in just an "outer ring" of contact between mechanical component 10 and mounting assembly 100. As may be appreciated by those of skill in the art, increased mounting and fixture stiffness in the installed arrangement can be realized when the mechanical component contacts and is torqued only or primarily against sleeve upper surface 148, due to the relatively larger diameter of sleeve 140 and the geometrical nature of the various mounting assembly components. As will also be appreciated, increased mounting or fixture stiffness can ensure that an installed vibration sensor or other mechanical component can operate and respond robustly as designed within the overall arrangement. For example, ensuring that an installed vibration sensor contacts sleeve 140 directly can establish a more reliable mechanical link between the sensor, the mounting assembly, and ultimately the mechanical asset, which can then result in more consistent vibration transmission from asset to sensor.

Accordingly, locking insert 160 can be positioned somewhat lower within sleeve 140 such that its locking insert upper surface 168 is at a level that is below the level of sleeve upper surface 148, such as during formation of mounting assembly 100. In various arrangements, this can mean that mechanical component 10 never contacts locking insert upper surface 168. In other arrangements, contact and torque from the bottom surface of mechanical component 10 can also occur against locking insert upper surface 168 of locking insert 160, such as where the locking insert upper surface 168 is at or becomes flush with the sleeve upper surface 148. In the event that sleeve upper surface 148 is at a somewhat higher level than locking insert upper surface 168, for example, it may be possible in some situations that torquing mechanical component 10 into mounting assembly 110 can result in the bottom surface of the mechanical component initially contacting and torquing only against the sleeve upper surface but then contacting and torquing against both sleeve upper surface and locking insert upper surface before torquing is completed.

As noted above, locking insert 160 can be press fit, friction fit, or otherwise affixed inside of sleeve 140 such that these components are firmly affixed with respect to each other. This can result in no lateral movement or rotational displacement of locking insert 160 within sleeve 140. In some arrangements, this can involve a sufficiently strong press or friction fit such that no welding, glue, or other adhesives are used. In other arrangements, a suitable glue, adhesive, and/or weld can be used to facilitate affixing locking insert 160 to sleeve 140. For example, locking insert 160 can be press or friction fit into sleeve 130, whereupon a ring weld can then be formed between the insert and sleeve along the upper juncture between them. As shown in FIG. 3C, such a ring weld (not shown) could be formed below both sleeve upper surface 148 and locking insert upper surface 168 due to the beveling along the upper regions of both sleeve 140 and locking insert 160. As will be readily appreciated, this can provide another reason as to why it may be preferable for sleeve upper surface 148 to be above or flush with locking insert upper surface 168, since initial contact and torque of the sensor or other mechanical component against only the insert upper surface may raise the risk of weld fatigue or other relative press fit stability of locking insert 160 within sleeve 140.

Figure 11A:
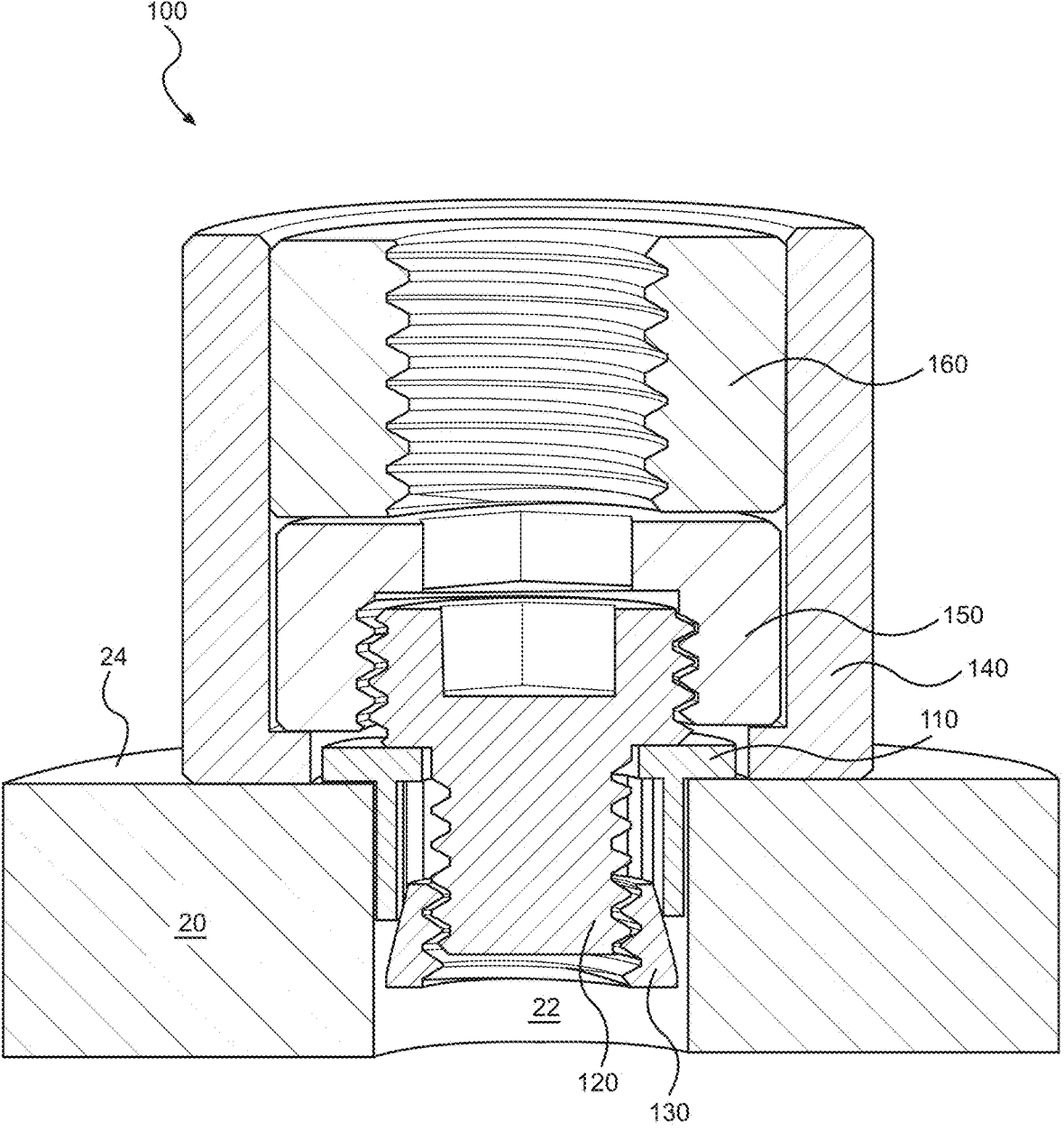
FIG. 11A illustrates in side elevation cross-section view an example expandable insert based mounting assembly placed into a threadless opening of a mechanical asset according to one embodiment of the present disclosure.

Transitioning now to FIG. 11A an example expandable insert based mounting assembly placed into a threadless opening of a mechanical asset is shown in side elevation cross-section view. Expandable insert based mounting assembly 100 is shown as being placed within threadless opening 22 of separate mechanical asset 20. As shown, mounting assembly 100 can be situated such that the flexible tabs of expandable insert 110, threaded protrusion of anchoring bolt 120, and all of conical expander 130 are inserted into threadless opening 22, while the insert flange of the expandable insert, the threaded flange of the anchoring bolt, and all of sleeve 140, locking nut 150, and locking insert 160 remain outside of the threadless opening. In particular, the bottom surfaces of both the insert flange and endcap contact flush against outer surface 24 of separate mechanical asset 20.

As shown, expandable insert based mounting assembly 100 is configured such that a threaded protrusion of a separate mechanical component can be rotatably inserted and tightened into the threaded inner opening of locking insert 160 to a desired amount of torque. When locking nut 150 and anchoring bolt 120 have both been torqued to sufficient amounts, this can then result in mounting the separate mechanical component to separate mechanical asset 20.

Expandable insert based mounting assembly 100 is also configured such that locking nut 150 can be rotatably tightened onto anchoring bolt 120 to a desired amount of torque. Such tightening can clamp the endcap of sleeve 140 between the bottom surface of locking nut 150 and outer surface 24 of separate mechanical asset 20, such that the sleeve is firmly locked in place against the mechanical asset and is unable to rotate or move laterally or vertically.

In specific arrangements where the mechanical component is a vibration sensor configured to track vibrations in the mechanical asset it can be important to have a reliable vibration transmission path through expandable insert based mounting assembly 100 so that vibration readings at the sensor are accurate. As will be readily understood by those of skill in the art, some factors that can degrade vibration transmission from a source to a sensor can include multiple part interfaces, irregular part geometries, soft part materials, and minimal surface contact between parts along a primary vibration transmission path. It can thus be preferable that expandable insert based mounting assembly 100 be designed so as not to rely on vibration transmission through multiple different parts where there are multiple part interfaces, such as at or near its longitudinal center as shown in FIG. 11A. Rather, expandable insert based mounting assembly 100 can be designed such that a primary vibration transmission path travels through sleeve 140 from the mechanical asset to the vibration sensor. As such, sleeve 140 can be formed from a hard material, such as steel, and the amount of surface contact can be maximized between top surface 24 of mechanical asset 20 and bottom surface 144 of sleeve endcap 143 (as shown in FIG. 8B). The diameter of endcap opening 145 can thus be kept as small as possible to maximize the surface area of sleeve endcap bottom surface 144. Accordingly, tightening locking nut 150 can not only clamp sleeve endcap 143 between the bottom surface of the locking nut and the outer surface 24 of separate mechanical asset 20 such that the sleeve is firmly locked in place and is unable to rotate or move laterally or vertically, but such clamping can also help to provide a sufficiently reliable primary vibration transmission path from the mechanical asset through the mounting assembly and into the vibration sensor.

Expandable insert based mounting assembly 100 is also configured so that anchoring bolt 120 can be rotated, which pulls conical expander 130 upward along the anchoring bolt toward the expandable insert flange, which in turn causes the conical outer surface of the conical expander to contact and push outward the flexible tabs, which then in turn forces the flexible tabs into the sidewall of threadless opening 22. Rotating and tightening anchoring bolt 120 to a sufficient amount of torque can then create a desired amount of outward radial force from the flexible tabs that then fasten mounting assembly 100 to separate mechanical asset 20

It can be possible to rotate and tighten anchoring bolt 120 in the configuration of mounting assembly 100 as shown, such as by accessing the bolt tightening feature by extending and operating a hex wrench through the openings in locking insert 160 and locking nut 150. It can be preferable in some arrangements, however, to rotate and tighten anchoring bolt 120 while locking nut 150 is not engaged onto the anchoring bolt. In fact, it can be beneficial or easier to install only the expansion subassembly into threadless opening 22 without the presence of the locking subassembly.

Figures 11B, 11C:
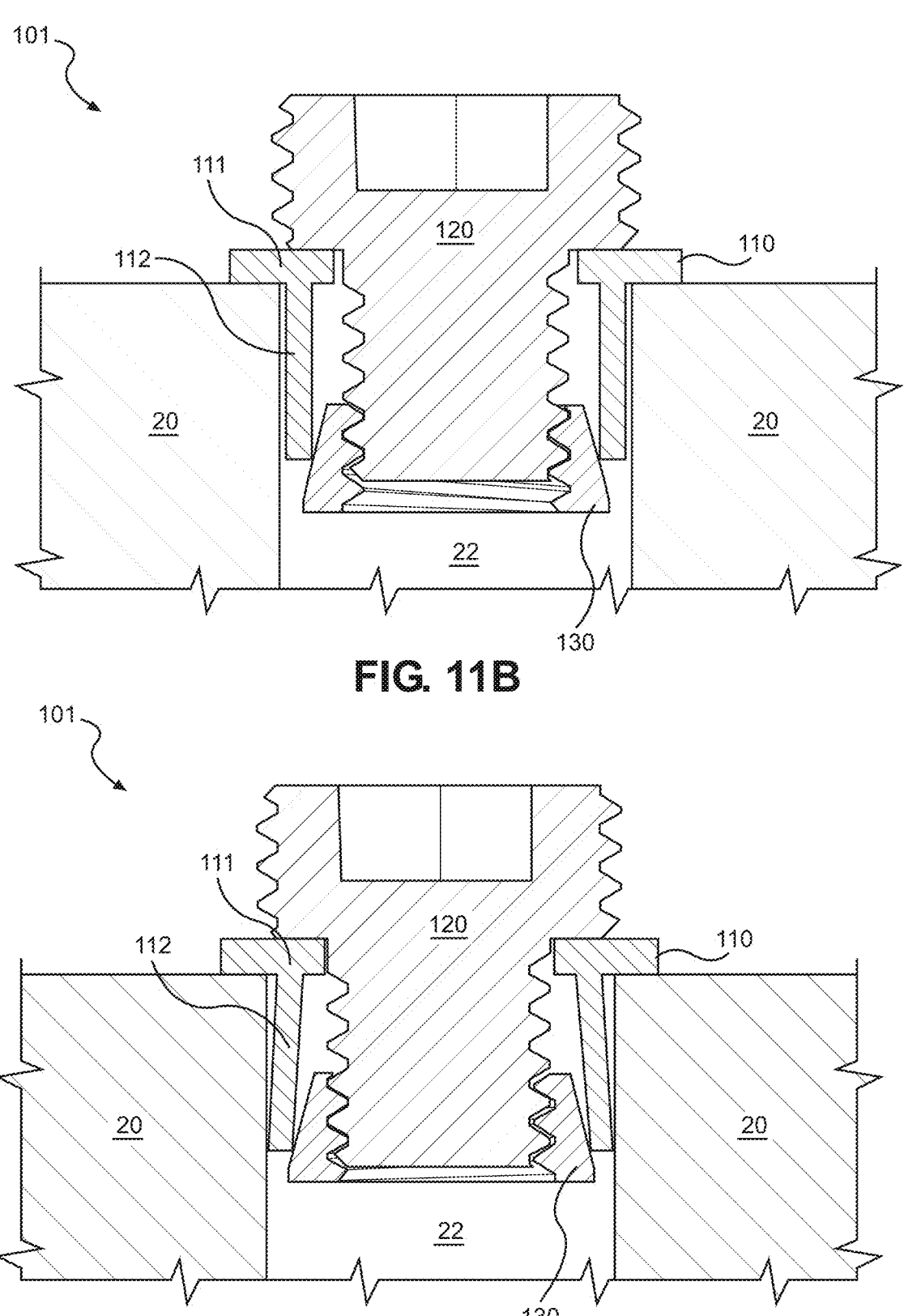
FIG. 11B illustrates in side elevation cross-section view an example expansion subassembly of an expandable insert based mounting assembly placed into a threadless opening of a mechanical asset prior to actuating its expansion features according to one embodiment of the present disclosure.
FIG. 11C illustrates in side elevation cross-section view the expansion subassembly of FIG. 11B after actuating its expansion features according to one embodiment of the present disclosure.

Moving next to FIGS. 11B and 11C, an example expansion subassembly is illustrated in side elevation cross-section view as being placed into a threadless opening of a mechanical asset prior to actuating its expansion features and then after actuating its expansion features. As shown in FIG. 11B, expansion subassembly 101 is arranged similarly to that which is shown in FIG. 11A above, with flexible tabs 112 extending straight downward from insert flange 111 into threadless opening 22 and with conical expander 130 being positioned below the bottom distal edges of the flexible tabs.

FIG. 11C reflects changes in expansion subassembly 101 as a result of anchoring bolt 120 being rotated. As shown, conical expander 130 has traveled upward along the threaded protrusion of anchoring bolt 120 and is now closer to insert flange 111. This has resulted in the conical outer surface of conical expander 130 contacting flexible tabs 112 and pushing them outward as the conical expander moves upward. Flexible tabs 112 are then pushed into the sidewalls of threadless opening 22, resulting in outward radial forces from the flexible tabs and conical expander into the sidewalls sufficient to fasten expansion subassembly 101 in place. In some arrangements, a significant amount of tightening or torque can even result in deformation of the flexible tabs 112 and/or sidewalls of threadless opening 22, which deformation can further serve to affix or mount expansion subassembly 101 to mechanical asset 20.

Figure 11D:
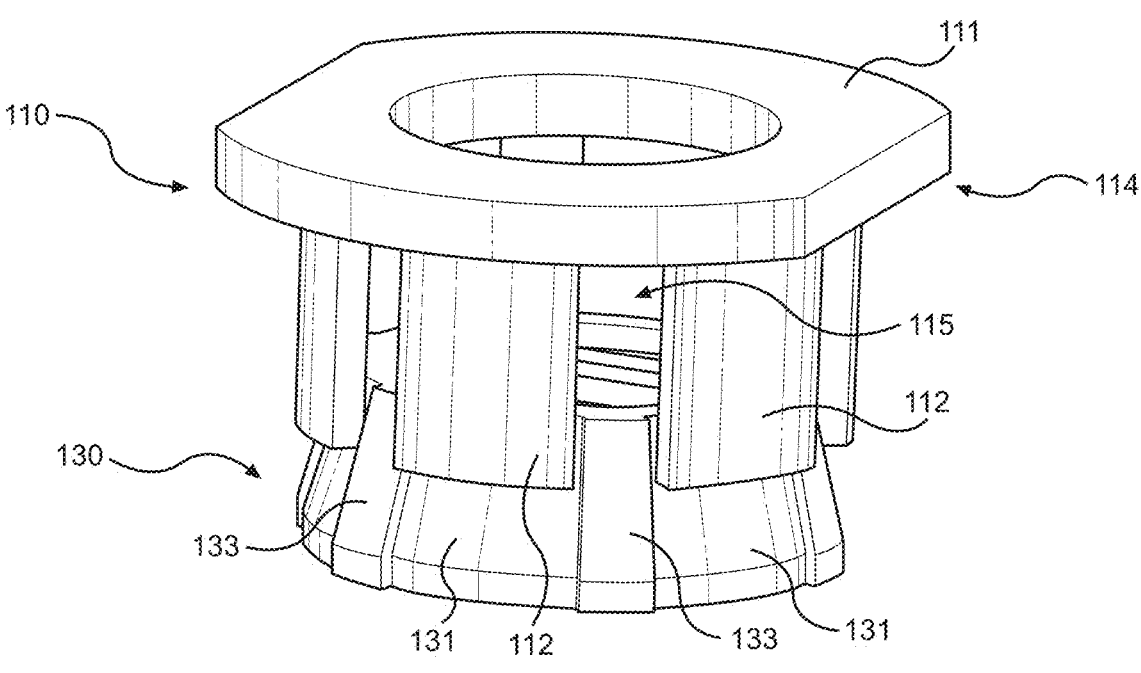
FIG. 11D illustrates in side perspective view an example expandable insert and conical expander arrangement for an expandable insert based mounting assembly according to one embodiment of the present disclosure.
Figure 11E:
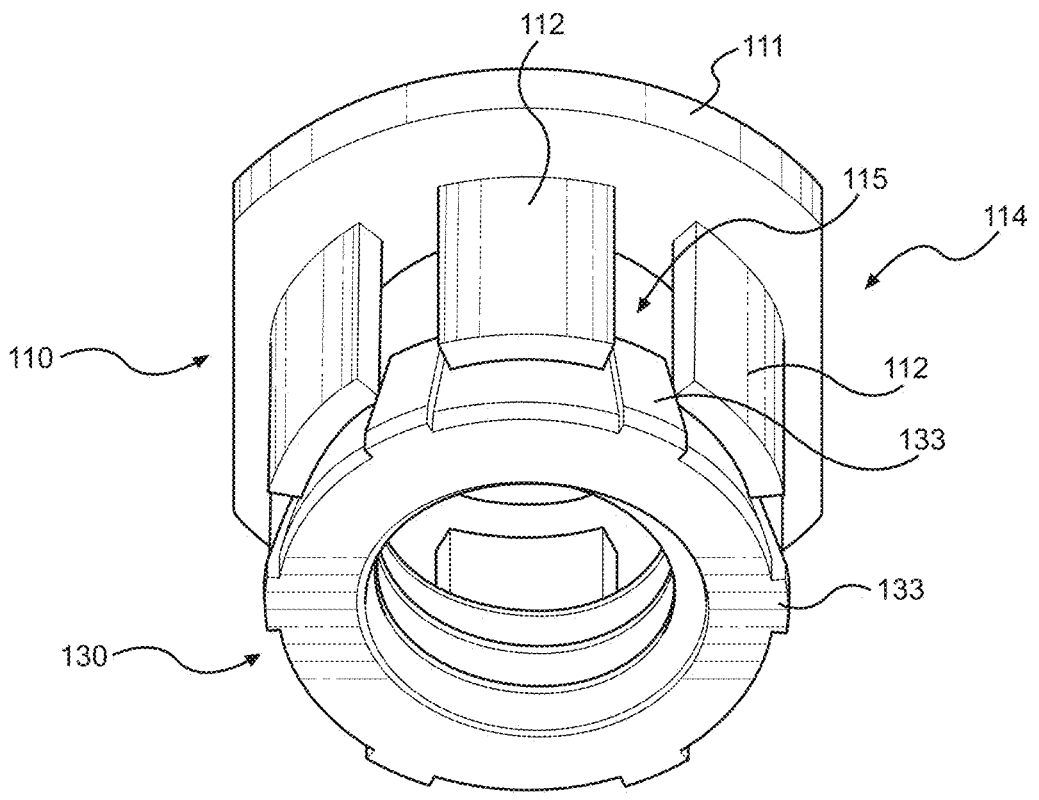
FIG. 11E illustrates in bottom perspective view the expandable insert and conical expander arrangement of FIG. 11D according to one embodiment of the present disclosure.

FIGS. 11D and 11E illustrates an example expandable insert and conical expander arrangement for an expandable insert based mounting assembly in side perspective and bottom perspective views respectively. As shown in these figures isolating expandable insert 110 and conical expander 130, each flexible tab 112 can be arranged to contact its own separate region of conical outer surface 131. Vertical ribs 133 protruding upward from conical outer surface 131 can align with gaps 115 between flexible tabs 112, such that each flexible tab is located between two vertical ribs as the conical outer surface moves upward and pushes against the flexible tabs. Not only do vertical ribs 133 provide convenient spacing between flexible tabs 112 as these components move vertically and laterally, but these ribs also serve to prevent relative rotation between expandable insert 110 and conical expander 130, as such relative rotation can possibly result in less uniform and more unpredictable and irregular movements in flexible tabs 112.

In some arrangements, both expandable insert 110 and conical expander 130 can be forced not to rotate during actuation of expansion subassembly 101 within threadless opening 22. To prevent rotation of expandable insert 110, a suitable wrench, grip, or other tool can grip or hold flat regions 114 along the outer circumference of insert flange 111 while the anchoring bolt is rotated. While rotating the anchoring bolt might ordinarily cause conical expander 130 to fully or partially rotate with the bolt due to their mating thread coupling, vertical ribs 133 can prevent such rotation. In the event that conical expander 130 might have a tendency to rotate with the rotating anchoring bolt, the sides of vertical ribs 133 will contact and abut against the sides of flexible tabs 112 such that the tabs prevent the ribs from rotationally progressing. Because the flexible tabs 112 and all of expandable insert 110 is being prevented from rotating by holding the insert at flat regions 114, then vertical ribs 133 and all of conical expander 130 similarly will not rotate as the anchoring bolt is being rotated.

Lastly, FIG. 12 illustrates a flowchart of an example detailed method of mounting a mechanical component to a mechanical asset using an expandable insert based mounting assembly. Detailed method 1200 can represent one possible way of mounting a mechanical component to a mechanical asset using an expandable insert based mounting assembly, and it will be understood that various other steps, features, and details of such a detailed method are not provided here for purposes of simplicity. Detailed method 1200 can include some or all steps and details of summary method 200 above, as will be readily appreciated. While detailed method 1200 contemplates mounting a vibration sensor to an industrial motor, for example, it will be readily appreciated that other mechanical components and/or other mechanical assets can alternatively be used.

After a start step 1202, an initial optional process step 1204 can involve forming a threadless opening in a mechanical asset. Step 1204 can be performed in situations where a suitable threadless opening does not already exist in the mechanical asset. Forming the threadless opening can involve simply drilling a cylindrical hole or opening into an outer surface of the mechanical asset at a desired location, with the opening having a width and depth that corresponds to an expandable insert on the mounting assembly to be used. Since no thread needs to be cut or formed, the opening can have a shorter depth than what would otherwise be needed for thread formation, as will be readily appreciated.

At the next process step 1206, an expansion subassembly can be placed into a threadless opening in a mechanical asset. Step 1206 can be identical or substantially similar to step 204 above in some arrangements, and again the expansion subassembly can include an expandable insert having one or more expansion features, an expander, and an anchoring component having an anchoring feature that remains outside the threadless opening while the expansion features are placed within the threadless opening.

At a subsequent process step 1208, an insert flange of the expandable insert can be held in place outside the threadless opening. In particular, the insert flange can be held such that the expandable insert is unable to rotate with respect to the threadless opening. This can involve holding flat regions along the outer circumference of the insert flange, for example, which can include the use of a wrench or other suitable tool.

Process step 1210 can involve rotating the anchoring component, which can further include a threaded protrusion that extends into the expander within the threadless opening. This can be done while holding the insert flange in place, such that steps 1208 and 1210 are performed simultaneously. Rotating the anchoring component can actuate the expander within the threadless opening. For example, the anchoring component can be an anchoring bolt and rotating the bolt can cause the expander to travel along the bolt by way of a threaded mating arrangement such as that which is set forth above.

At process step 1212, the one or more expansion features can be actuated into one or more sidewalls of the threadless opening. Step 1212 can be identical or substantially similar to step 206 above in some arrangements. Actuating the expansion features into the sidewall can fasten the expansion subassembly to the mechanical asset, such as by generating outward radial forces that anchor the subassembly against the sidewall. In some arrangements, actuating the expansion features can be a direct consequence of actuating the expander, such that step 1212 is an automatic result of performing step 1210.

At the next process step 1214, a locking subassembly can be positioned over the expansion subassembly. Step 1214 can be identical or substantially similar to step 208 above in some arrangements, and again the locking subassembly can include an outer base, a locking component, and a threaded inner opening at a fixed location relative to the outer base. The locking subassembly can be positioned over the anchoring feature of the expansion subassembly.

Following process step 1216 can involve locking the subassemblies together to finish forming the mounting assembly. Step 1216 can be identical or substantially similar to step 210 above in some arrangements. Again, this can involve locking the locking component of the locking subassembly to the anchoring feature of the expansion subassembly to finish forming an expandable insert based mounting assembly including the locking subassembly and the expansion subassembly. Locking can also include suitably tightening the locking component to lock all subassemblies and components in place against the mechanical asset.

At a subsequent process step 1218, the mechanical component can be coupled to the mounting assembly. Step 1216 can be identical or substantially similar to step 212 above in some arrangements and again can involve rotatably inserting a threaded portion of the mechanical component into the threaded inner opening of the mounting assembly.

The next process step 1220 can involve tightening the threaded portion of the mechanical component into the threaded inner opening of the locking subassembly until a bottom surface of the mechanical component contacts an upper surface of the outer base and a desired torque value is achieved. In some arrangements, this can result in a desired rotational orientation of the mechanical component, such as where the thread of the threaded inner opening is designed to facilitate arriving at the desired rotational orientation when proper torque is applied. In some cases this can also involve a proper arrangement and attachment between a locking insert and sleeve of the locking subassembly. This can include, for example, a proper thread orientation relative to flat regions on the exterior of the sleeve and a sleeve upper surface that is higher than a locking insert upper surface, such as that which is detailed above.

Detailed method 1200 can then end at end step 1222. Again, the mechanical component and mechanical asset can be separate items from each other and also separate from the mounting assembly, which can be used to mount one of these separate items to the other. In some arrangements, one or more of the foregoing steps can be performed simultaneously or in a different order. For example, step 1208-1212 can all be performed simultaneously. Not all steps are necessary in all situations, and other steps and details may be added.

Although the foregoing disclosure has been described in detail by way of illustration and example for purposes of clarity and understanding, it will be recognized that the above described disclosure may be embodied in numerous other specific variations and embodiments without departing from the spirit or essential characteristics of the disclosure. Certain changes and modifications may be practiced, and it is understood that the disclosure is not to be limited by the foregoing details, but rather is to be defined by the scope of the appended claims.

What is claimed is:

1. A mounting assembly, comprising:
an expansion subassembly including an expandable insert having one or more expansion features, an expander configured to actuate the one or more expansion features, and an anchoring component having an anchoring feature coupled to the expandable insert and expander, wherein the expansion subassembly is configured to be placed within a threadless opening in a separate mechanical asset such that the anchoring feature remains outside the threadless opening while the expander actuates the one or more expansion features into one or more sidewalls of the threadless opening to fasten the expansion subassembly to the separate mechanical asset; and a locking subassembly including an outer base, a locking component, and a threaded inner opening at a fixed location relative to the outer base and configured to accept a rotational insertion therein of a threaded portion of a separate mechanical component, wherein the locking component is configured to couple to the anchoring feature and to lock the locking subassembly in place relative to the anchoring feature and separate mechanical asset such that insertion of the separate mechanical component threaded portion into the threaded inner opening mounts the separate mechanical component to the separate mechanical asset.

2. The mounting assembly of claim 1, wherein the separate mechanical asset is an industrial engine and the separate mechanical component is a vibration sensor.

3. The mounting assembly of claim 1, wherein the expansion subassembly is configured to be installed into the separate mechanical asset without the presence of the locking subassembly.

4. The mounting assembly of claim 1, wherein the anchoring component is configured to actuate the expander.

5. The mounting assembly of claim 1, wherein the expandable insert includes an insert flange having a central opening and the one or more expansion features include one or more flexible tabs arranged around the central opening and extending downward from the insert flange, the expandable insert configured to be placed across the threadless opening such that the insert flange remains above the threadless opening and the one or more flexible tabs extend into the threadless opening in position be pushed outward into one or more sidewalls of the threadless opening.

6. The mounting assembly of claim 5, wherein the anchoring component is a double threaded bolt including a threaded protrusion extending from a threaded flange, the threaded protrusion defining a first diameter and the threaded flange defining a second diameter that is greater than the first diameter, and wherein the threaded protrusion is configured to extend into the threadless opening to actuate the expander and the threaded flange is configured to form the anchoring feature outside the threadless opening.

7. The mounting assembly of claim 6, wherein the expander is a conical expander including a conical outer surface having a top outer diameter smaller than a bottom outer diameter and a threaded central opening extending therethrough, the threaded central opening being coupled onto the threaded protrusion of the double threaded bolt, wherein the conical expander is configured such that rotating the anchoring bolt results in pulling the conical expander upward toward the insert flange such that the conical outer surface contacts and pushes the one or more flexible tabs into the one or more sidewalls of the threadless opening.

8. The mounting assembly of claim 1, wherein the outer base includes a sleeve including one or more walls coupled to an endcap at a bottom end thereof to define an inner volume having a sleeve opening at a top end, the endcap including a bottom surface configured to contact an outer surface of the separate mechanical asset and an endcap opening configured to be placed over the anchoring feature such that the anchoring feature extends into the inner volume.

9. The mounting assembly of claim 8, wherein the locking component includes a locking nut having an internal thread configured to be coupled onto a thread of the anchoring feature and an outer diameter that is greater than the endcap opening diameter but less than the inner volume diameter such that the locking nut is configured to be contained and rotatable within the inner volume of the sleeve, and wherein the locking nut is configured to be rotatably tightened onto the anchoring feature to clamp the endcap against the separate mechanical asset and lock the sleeve in place.

10. The mounting assembly of claim 9, wherein the locking subassembly further includes a locking insert fitted within the sleeve opening such that the locking insert is unable to move relative to the sleeve and the locking nut is fully constrained within the inner volume, the locking insert including the threaded inner opening.

11. The mounting assembly of claim 8, wherein the sleeve includes an upper surface configured to contact and provide a physical stop against a bottom surface of the separate mechanical component when the threaded portion of the separate mechanical component is inserted into and sufficiently rotated within the threaded inner opening.

12. A method of mounting a mechanical component to a mechanical asset using an expandable insert based mounting assembly, the method comprising:

placing an expansion subassembly into a threadless opening in a mechanical asset, the expansion subassembly including an expandable insert having one or more expansion features, an expander, and an anchoring component having an anchoring feature that remains outside the threadless opening while the expansion features are within the threadless opening;

actuating the one or more expansion features into one or more sidewalls of the threadless opening to fasten the expansion subassembly to the mechanical asset;

positioning a locking subassembly over the anchoring feature of the expansion subassembly, the locking subassembly including an outer base, a locking component, and a threaded inner opening at a fixed location relative to the outer base;

locking the locking component of the locking subassembly to the anchoring feature of the expansion subassembly to finish forming an expandable insert based mounting assembly including the locking subassembly and the expansion subassembly; and coupling the mechanical component to the mounting assembly by rotatably inserting a threaded portion of the mechanical component into the threaded inner opening of the locking subassembly.

13. The method of claim 12, further comprising:

forming the threadless opening in the mechanical asset;

holding an insert flange of the expandable insert in place outside the threadless opening;

rotating the anchoring component while holding the insert flange in place, the anchoring component further including a threaded protrusion that extends into the expander within the threadless opening, wherein rotating the anchoring component actuates the expander which in turn actuates the one or more expansion features; and tightening the threaded portion of the mechanical component into the threaded inner opening of the locking subassembly until a bottom surface of the mechanical component contacts an upper surface of the outer base and a desired torque value is achieved.

* * * * *